(12) United States Patent
Banks et al.

(10) Patent No.: US 7,534,476 B2
(45) Date of Patent: May 19, 2009

(54) IDENTIFICATION BADGE CONSTRUCTION

(75) Inventors: Donald E. Banks, Huntington Beach, CA (US); Jerry G. Hodsdon, Forestdale, MA (US); Ronald Ugolick, San Dimas, CA (US)

(73) Assignee: Avery Dennison Corporation, Pasadena, CA (US)

( * ) Notice: Subject to any disclaimer, the term of this patent is extended or adjusted under 35 U.S.C. 154(b) by 333 days.

(21) Appl. No.: 10/641,132

(22) Filed: Aug. 14, 2003

(65) Prior Publication Data

US 2004/0091659 A1 May 13, 2004

Related U.S. Application Data

(60) Provisional application No. 60/466,689, filed on Apr. 30, 2003, provisional application No. 60/446,817, filed on Feb. 11, 2003, provisional application No. 60/432,941, filed on Dec. 11, 2002, provisional application No. 60/411,268, filed on Sep. 16, 2002.

(51) Int. Cl.
*B32B 9/00* (2006.01)
*B32B 33/00* (2006.01)
*G09F 3/00* (2006.01)
*A44C 3/00* (2006.01)
*B42D 15/00* (2006.01)

(52) U.S. Cl. ............ 428/40.1; 428/42.1; 428/42.2; 428/42.3; 428/43; 428/136; 428/137; 40/1.5; 283/81

(58) Field of Classification Search ............ 428/40.1, 428/42.1, 42.2, 42.3, 43, 136, 137; 40/1.5; 283/81
See application file for complete search history.

(56) References Cited

U.S. PATENT DOCUMENTS 4,500,116 A * 2/1985 Ferro et al. ............ 283/92

(Continued)

FOREIGN PATENT DOCUMENTS

WO WO2003/074293 9/2003

(Continued)

OTHER PUBLICATIONS

Access Sentry product characterization (internal document prepared by Avery Dennison Corporation), dated Feb. 26, 2003.

(Continued)

*Primary Examiner*—Patricia L Nordmeyer
(74) *Attorney, Agent, or Firm*—Patent Group Law Department Avery Dennison Corporation

(57) ABSTRACT

A label badge sheet construction including a facestock sheet releasably adhered to a liner sheet. A weakened separation line in the facestock sheet defines at least one label. After the sheet construction has been passed through a printer or copier and desired indicia printed on the at least one label the printed label can be removed to be used as a visitor's badge or the like. Preferably, first and second labels are formed with a fold line separating them, and a weakened separation line through the liner sheet forms a liner panel which is adhered to the back of the first label. With the first and second labels and the liner panel removed as a label assembly and the labels folded on the fold line, through-holes through the first and second labels and the liner panel are aligned. A lanyard or clip can be passed through the aligned through-holes. The liner panel thereby reinforces the through-holes. The invention further includes the assembled label badge, the method of forming same, the method for manufacturing the sheets and the kit which includes sheets, software, hardware, etc.

19 Claims, 23 Drawing Sheets

U.S. PATENT DOCUMENTS

| | | | |
|---|---|---|---|
| 4,653,775 A | | 3/1987 | Raphael et al. |
| 4,900,903 A | | 2/1990 | Wright et al. |
| 4,986,868 A | | 1/1991 | Schmidt |
| 5,058,926 A | | 10/1991 | Drower |
| 5,075,769 A | | 12/1991 | Allen et al. |
| 5,172,938 A | | 12/1992 | Schmidt |
| 5,180,906 A | | 1/1993 | Yamada |
| 5,209,514 A | | 5/1993 | Hebert |
| 5,318,326 A | * | 6/1994 | Garrison ............... 283/101 |
| 5,362,106 A | | 11/1994 | Longtin |
| 5,509,693 A | | 4/1996 | Kohls |
| 5,518,787 A | | 5/1996 | Konkol |
| 5,529,345 A | | 6/1996 | Kohls |
| 5,617,528 A | | 4/1997 | Stechmann et al. |
| 5,662,976 A | | 9/1997 | Popat et al. |
| D386,793 S | | 11/1997 | Haas et al. |
| 5,700,037 A | * | 12/1997 | Keller ............... 283/107 |
| 5,717,776 A | | 2/1998 | Watanabe |
| D394,675 S | | 5/1998 | Haas et al. |
| 5,814,796 A | | 9/1998 | Benson et al. |
| 5,840,143 A | | 11/1998 | Swanson |
| 5,913,542 A | | 6/1999 | Belucci et al. |
| 5,997,683 A | | 12/1999 | Popat |
| 6,000,608 A | | 12/1999 | Dorf |
| 6,002,427 A | | 12/1999 | Kipust |
| D419,595 S | | 1/2000 | Haas et al. |
| 6,014,748 A | | 1/2000 | Tushic et al. |
| 6,038,012 A | | 3/2000 | Bley |
| 6,078,756 A | | 6/2000 | Squilla et al. |
| 6,104,922 A | | 8/2000 | Baumann |
| 6,142,531 A | | 11/2000 | Harris, II |
| 6,179,201 B1 | | 1/2001 | Chess |
| 6,197,396 B1 | | 3/2001 | Haas et al. |
| 6,220,515 B1 | | 4/2001 | Bello |
| 6,230,148 B1 | | 5/2001 | Pare, Jr. et al. |
| D445,127 S | | 7/2001 | Haas et al. |
| 6,292,092 B1 | | 9/2001 | Chow et al. |
| 6,308,886 B1 | | 10/2001 | Benson et al. |
| 6,335,799 B1 | | 1/2002 | Provost |
| 6,356,942 B1 | | 3/2002 | Bengtsson et al. |
| 6,394,356 B1 | | 5/2002 | Zagami |
| 6,402,028 B1 | | 6/2002 | Graham, Jr. et al. |
| 6,412,692 B1 | | 7/2002 | Miyagawa |
| 6,517,921 B2 | | 2/2003 | Ulrich et al. |
| D476,680 S | | 7/2003 | Haas |
| 6,619,480 B2 | * | 9/2003 | Smith ............... 206/555 |
| 6,632,250 B1 | | 10/2003 | Lynch et al. |
| 2002/0047263 A1 | | 4/2002 | McCarthy et al. |
| 2003/0168850 A1 | | 9/2003 | Mann |

FOREIGN PATENT DOCUMENTS

| | | | |
|---|---|---|---|
| WO | WO 2004/034347 A1 | 4/2004 | |

OTHER PUBLICATIONS

Access Sentry(TM) product brochure, marked with "(c) 2000 C13 Software" and accompanying CD ROM disc marked "(c) 2001 C13 Software(TM)".
Access Specialties ASI 2000 product brochure, Photo Gold(TM) product description and screens, and accompanying cover letter dated Oct. 17, 2002.
Access Specialties product characterization (internal document prepared by Avery Dennison Corporation), dated Feb. 26, 2003.
AsureID(TM) Enterprise product brochure, marked "(c) 2002 Synercard Corporation . . . Printed in Canada Jan. 2002".
Easy Lobby SVM 6.0 product characterization (internal document prepared by Avery Dennison Corporation), dated Feb. 26, 2003.
EasyLobby Badge Sample, marked with "Apr. 4, 2001".
EasyLobby product description in email from EasyLobby representative, sent Feb. 18, 2003.
EasyLobby(R) SVM(TM) 6.0 Product Brochure, marked "(c)2002-2003 EasyLobby, Inc.".
GBC Video ID System product characterization (internal document prepared by Avery Dennison Corporation), dated Feb. 26, 2003.
HID Corporation proximity card and reader product brochure, marked as "(c) 2001 HID Corporation."
IDville ID Maker(TM) product brochure and cover letter dated Feb. 17, 2003.
IDville product characterization (internal document prepared by Avery Dennison Corporation), dated Feb. 26, 2003.
Laminex ID In A Flash(TM) product brochure and catalog, and cover letter dated 2002.
Laminex product characterization (internal document prepared by Avery Dennison Corporation), dated Feb. 26, 2003.
Lenel OnGuard product characterization (internal document prepared by Avery Dennison Corporation), dated Feb. 26, 2003.
Lenel Systems International, Inc. press release entitled "Lenel Launches OnGuard E-VISITOR(TM), the First Internet-Based Visitor Management Solution in the Security Industry," marked Sep. 28, 1999, printout dated Jun. 11, 2002.
New York Times, "Advancing Technology Tightens Building Security", http://www.nytimes.com/2003/03/05/business, New York Times, Mar. 5, 2003.
Sisco Fast Pass product characterization. (internal document prepared by Avery Dennison Corporation), dated Feb. 26, 2003.
Sisco FAST-PASS(R) product brochure, marked as "Original Drawing Mar. 16, 2002".
Software House C*CURE(R) 800/8000 product brochure, marked "(c)2002".
Software House product characterization (internal document prepared by Avery Dennison Corporation), dated Feb. 26, 2003.
STOPware Passage Point product characterization (internal document prepared by Avery Dennison Corporation), dated Feb. 26, 2003.
STOPware(TM) PassagePoint v4.0 product brochure, marked with "Pricing good till Dec. 31, 2002".
Transtech Systems, Inc. Episuite product brochure, marked "(c) 2002 ImageWear Systems, Inc.".
USI Video ID System Office Security—Video ID System product description, printed from http://machinerunner.com/Video-ID-systems/USI-Video-ID-System.html, printout Feb. 25, 2003.
Web page entitled "Alpha Card Systems—Identification Badge & Card Systems," and related pages, http://www.a-card.com/information/identificationcardsystemindex.html, printout dated Jul. 19, 2002.
Web page entitled "Hartford Badges, your source for name badges, photo ID's and more . . . ," marked as "(c) 1996-2002 by Hartford Badges," http://www.hartfordbadges.com/,printout dated Jul. 19, 2002.
Web page entitled "Identification Resources" and related pages, http://www.idresources.com/, printout dated Jul. 19, 2002.
Web page entitled "OneCard Online" and related pages, http://www.onecardonline.com/onehome.html, printout dated Jul. 19, 2002.
Web page entitled "The DeXa.Badge Offering," http://www.slb.com/Hub/Docs/tt/nws/dexa/L2_badge.html, marked as "Copyright 2001 Schlumberger Limited", printout dated Jul. 19, 2002.
Marjan Bradesko et al., Identification Procedures, Using the Combination of Optical and Chipcard, IEEE, 1991, pp. 1192-1195.
Jana Dittmann et al., Hologram Watermarks for Document Authentications, IEEE, 2001, pp. 60-64.
Barbara Rose, Zebra to Acquire Maker of Photo ID Card Printers, Chicago Tribune, Nov. 20, 2003, p. 4.
Nextnode International Nework Corporation, 102310 Badge Maker Kit II product description, http://www.aniprint.com/products/102310a.htm printout dated May 4, 2004.

* cited by examiner

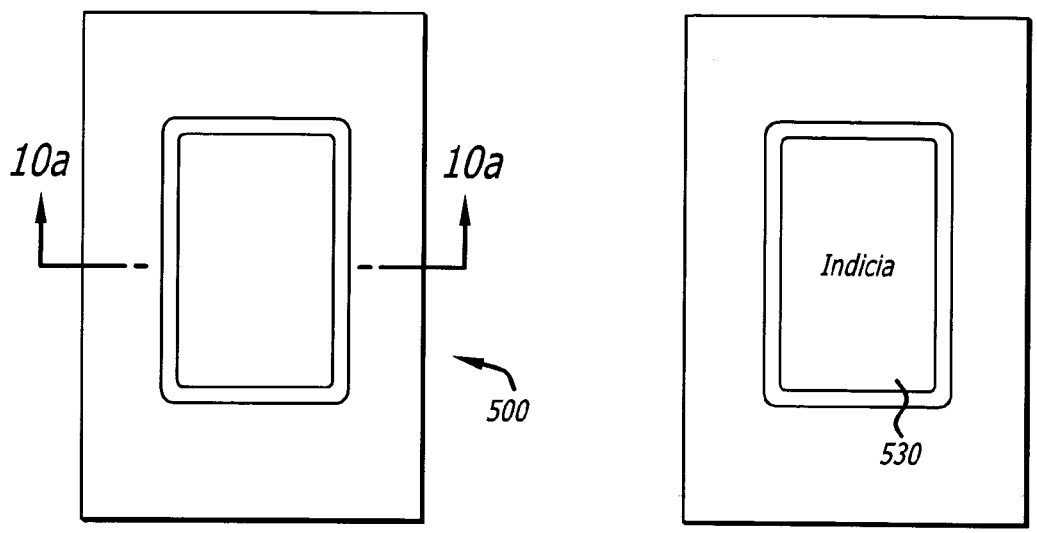
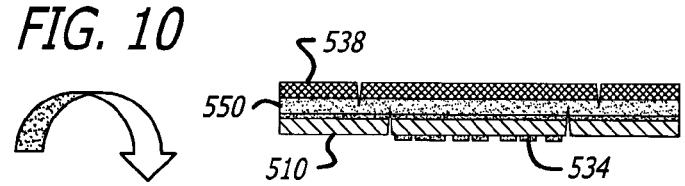
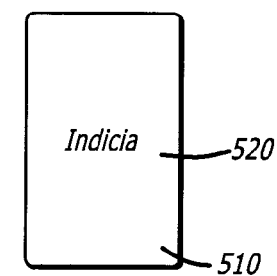
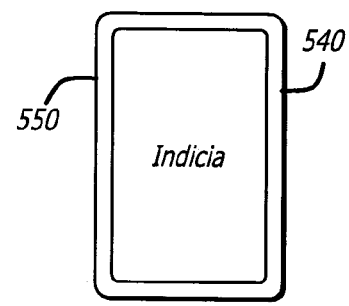
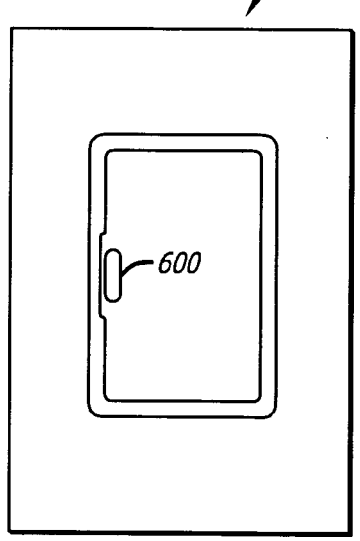
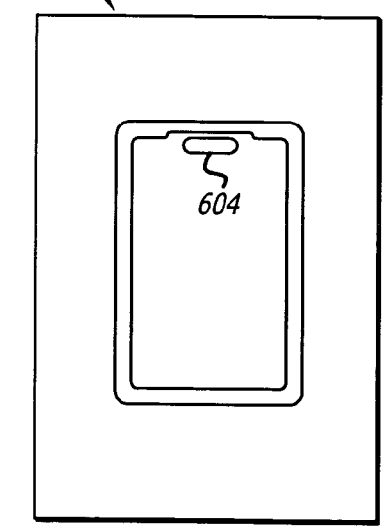
FIG. 10   FIG. 11
FIG. 10a
FIG. 10b   FIG. 11a
FIG. 12   FIG. 13

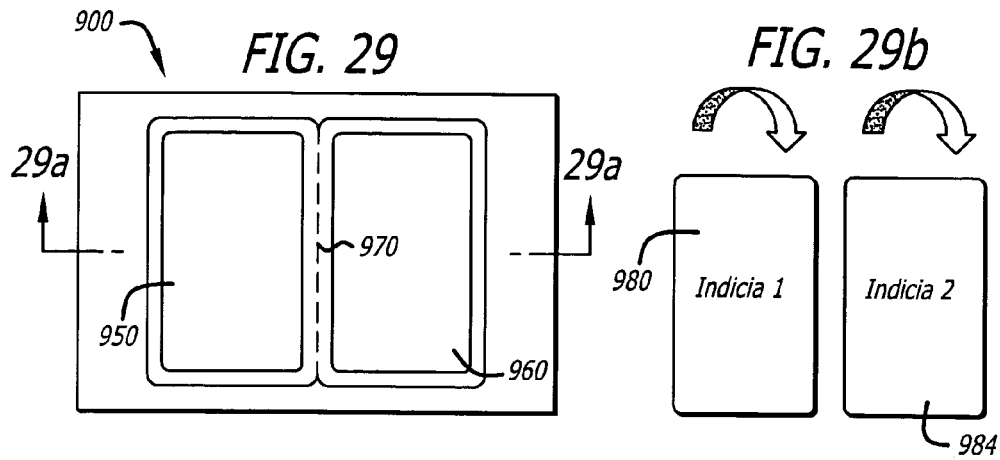
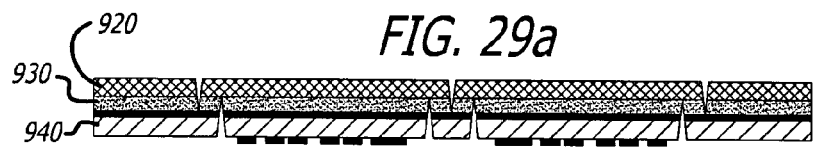
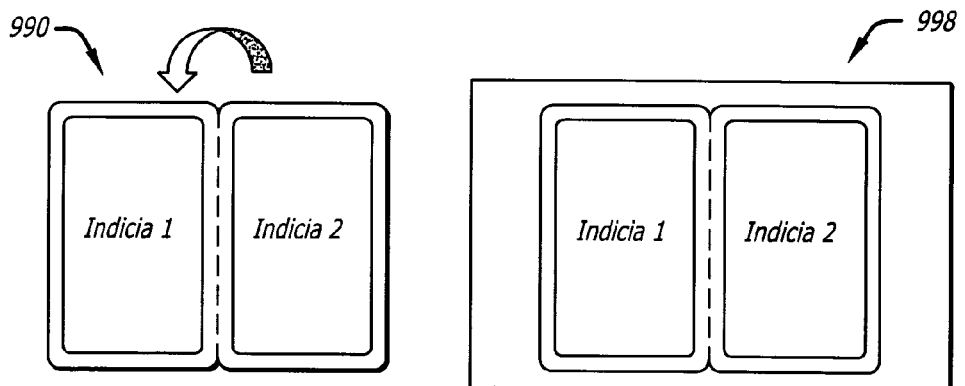
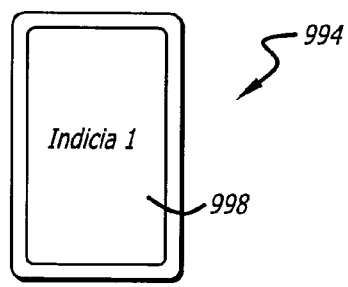

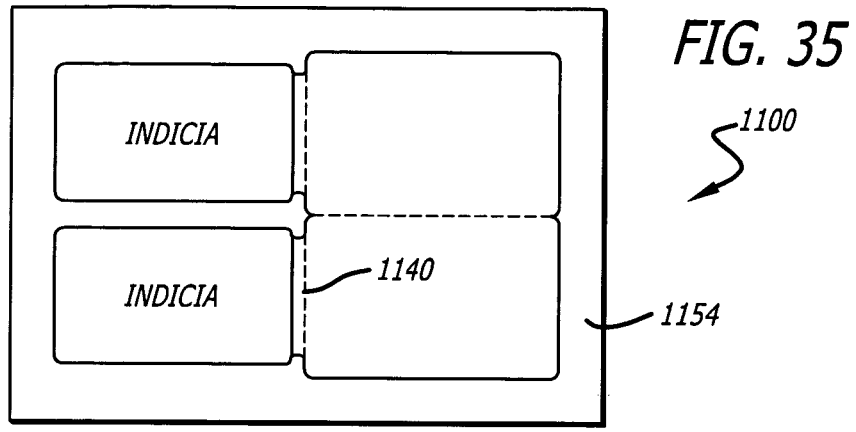
FIG. 35
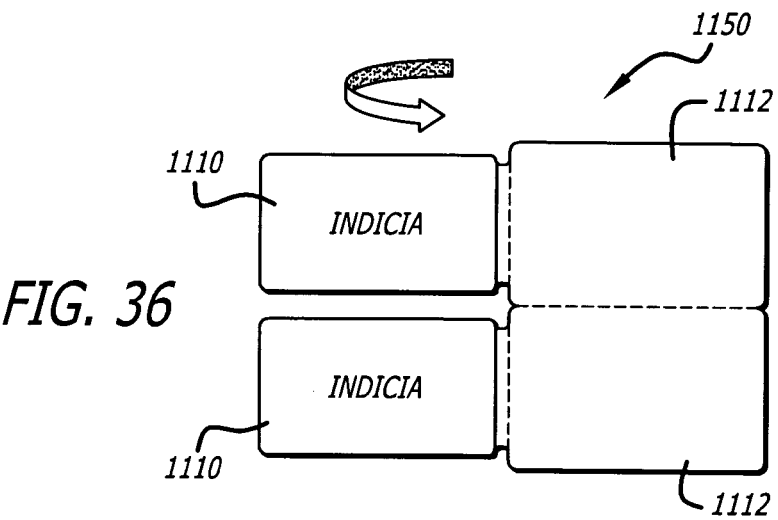
FIG. 36
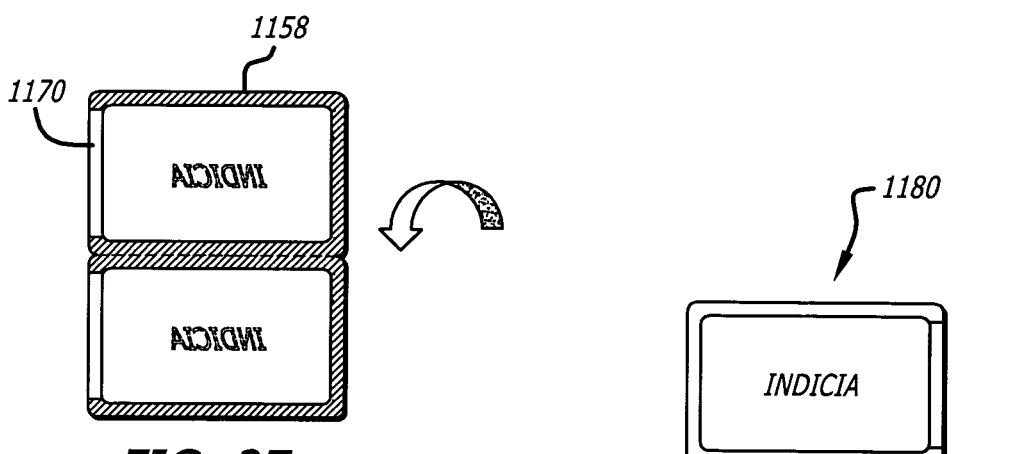
FIG. 37
FIG. 38

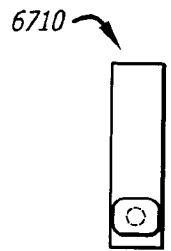
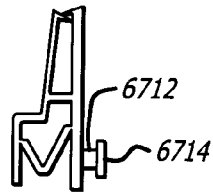
FIG. 67A  FIG. 67B
(Prior Art) (Prior Art)
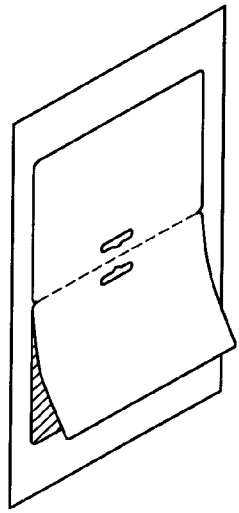
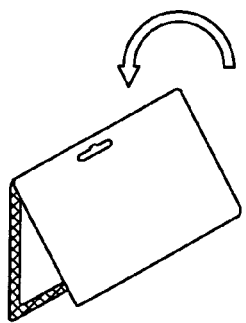
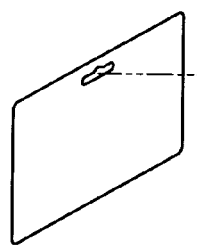
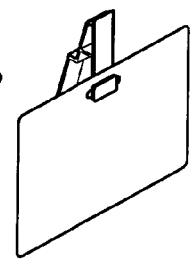
FIG. 68A  FIG. 68B  FIG. 68C  FIG. 68D
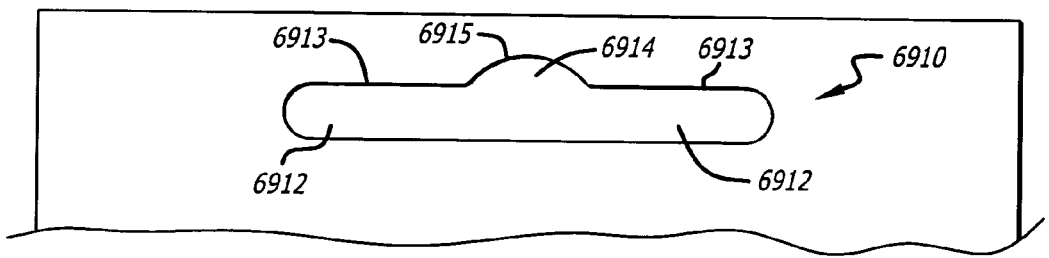
FIG. 69

IDENTIFICATION BADGE CONSTRUCTION

CROSS-REFERENCE TO RELATED APPLICATIONS

This application claims priority from the following U.S. Provisional Applications: Ser. No. 60/446,817, filed Feb. 11, 2003; Ser. No. 60/411,268, filed Sep. 16, 2002; Ser. No. 60/432,941, filed Dec. 11, 2002; and Ser. No. 60/466,689, filed Apr. 30, 2003. The entire contents of all of these applications are incorporated by reference.

FIELD OF THE INVENTION

This invention relates to the field of identification badges. More particularly, this application relates to the field of identification badge construction and printing.

BACKGROUND OF THE INVENTION

Visitor management has been addressed in many different ways. One of the most common is a self-adhesive name badge. Although there are certain advantages to having a badge inserted into a clear plastic sleeve and suspended from a lanyard or attached to visitor's clothing via a clip, or placed into a badge carrier of some sort, a standard label cannot be used for such an application. There are times where the badge can flip over, making it ineffective to identify the visitor. There are also occasions where it may be preferable to provide the visitor or, in certain cases an employee, with a radio frequency identification (RFID) badge (card) that has visitor or employee identification attached to it. Additionally, at times the badge can be a very temporary badge, while at other times it may be desirable to provide some protection and permanence to the badge.

SUMMARY OF THE INVENTION

The present invention provides a method and medium for printing and forming identification badges using commonly available copiers or desk top printers, utilizing a multi-layer paper or paper and film laminate construction. The identification badges can include a visitor's name, the visitor's photograph, and other useful indicia. These identification badges can be used independently, or depending on the embodiment, adhered to a secondary surface, such as an RFID card. By conveniently making only a single pass through a desk top printer, these identification badges can be printed either on one side or on both sides thereof, depending on the embodiment. The printed surface may be open to the environment after printing and assembly, or it may be protected from the environment by a transparent film layer after printing and assembly, depending on the embodiment. These badges, once printed and assembled, can be placed directly into a badge holder, or, depending on the embodiment, suspended directly from a badge clip or lanyard, or, again depending on the embodiment, adhered to a secondary surface such as an RFID card. However, the present invention is not limited to badges, but can also be used for other applications, such as signage, instructional information, decorative applications, and so forth.

According to one preferred embodiment, disclosed herein is a label sheet construction which includes: (a) a liner sheet; (b) a facestock sheet releasably adhered with adhesive to the liner sheet; (c) at least one weakened separation line through the facestock sheet and defining a facestock label assembly, the label assembly including a first label and a second label, the label assembly further including a fold line or a fold hinge between the first and second labels, the label assembly being removable to a separated position from the facestock sheet after a printing operation on at least one of the first and second labels, the label assembly when in the separated position being foldable to a folded position wherein at least one of the first and second labels is folded towards the other on the fold line or the fold hinge; and (d) at least one weakened separation line through the liner sheet and defining a liner sheet panel, the panel being positioned on a back side of the first label and being adhered thereto by the adhesive with the facestock label assembly in the separated position and the folded position.

The invention also relates to various types of print media that may be used for printing the identification cards. One type of print media may be a spot metallic print media that has a printable coating that becomes transparent when printed with inkjet inks. Beneath the printable coating, which may be white and opaque when unprinted, there may be a metallic foil layer. Any printed areas may thus appear to be metallic in nature, even though they are printed with a standard desktop inkjet printer. The material may be configured in a variety of ways, for example, as a card stock or label stock, as a self-laminating product, and in various sheet sizes.

Another type of print media is, for example, a 4×6 inch format or the European equivalent that may be inserted into inkjet or laser jet printers and then a smaller printed identification card broken away from the sheet. The identification card (or 4×6 sheet) may be sized to fit a variety of applications. For example, the identification card may be sized to fit into a specific sleeve or identification card holder. One or more identification cards may be printed on the 4×6 sheet. Alternatively, the print media may be in roll-form. A roll may be used to continuously form feed a plurality of identification cards into an inkjet or laser printer, or it could feed into a direct thermal or thermal transfer printer or other types of desktop printers. The identification cards may then be torn away, cut away, or otherwise removed from the roll. The sheet or roll may be produced in, for example, matte or glossy versions and in various colors and textures of materials.

Another type of print media may be a validity indicator print media. The validity indicator print media may alter in appearance over time. The validity indicator print media may enable a user to activate a time function of an identification card when the identification card is issued. For example, the activation may be initiated by bringing an indicator image printed on the print media in contact with a second media construction, which could include bringing two separate layers of the print media into contact with one another. The time function may result in a change in appearance of the badge after a pre-established time period. For example, a time period may be built into the badge prior to issuance. The change in appearance may be a color change or the appearance of text or graphics to indicate that the badge is no longer valid. The print media may be formed such that it alters in appearance after approximately eight hours. Various constructions, compositions, and methods of use may be employed to effect a time indicating feature, as disclosed in U.S. patent application Ser. No. 10/383,460, filed Mar. 7, 2003 and assigned to Avery Dennison Corporation, which is hereby incorporated by reference in its entirety.

Another type of print media is a CLEAN EDGE print media, such as that disclosed in International Publication WO 00/16978 (PCT/US99/21854) published Mar. 30, 2000 and entitled "Business Card Sheet Construction and Methods of Making and Using Same." This publication is hereby incorporated by reference. CLEAN EDGE print media may use a material that is a printable card stock that may be die-cut into identification card shapes, but held together to an overall sheet assembly by a dry laminate or other non-pressure sensitive adhesive to a carrier. Alternatively, an ultra-removable adhesive to a carrier or a tape along the die-cuts may be used to maintain the identification card to the sheet assembly. The CLEAN EDGE print media may be a pre-cut identification card that may be peeled away from the sheet assembly leaving clean edges and no adhesive or sticky residue on the identification card. The CLEAN EDGE print media may be produced in a variety of sheet sizes and die-cut formats using a variety of card stock types.

One type of print media is a self-laminating print media described in U.S. Pat. Nos. 6,159,570 and 5,662,976, both of which are hereby incorporated by reference in their entireties. The self-laminating print media may be single-sided or double-sided. It is also within the scope of the invention for the self-laminating print media to be adhered to an RFID card.

Another type of print media may be an erasable print media. The erasable print media may enable information printed with a permanent marker to be erased. Examples of erasable print media are described in U.S. Pat. Nos. 5,736,525 and 5,587,408, both of which are also hereby incorporated by reference in their entireties.

Another type of print media is a lenticular sleeve print media. The lenticular sleeve print media may include indicia that may be viewed only using a particular lens material. The particular lens material may be, for example, a plastic sleeve or holder into which the print media is inserted. Such lenticular sleeve print media is described in U.S. Pat. No. 5,346,259, the contents of which are hereby incorporated by reference.

Another type of print media is a dry laminate having a clean edge. The laminate may be die-cut to form two sections of the identification card. The two sections may be separated by a weakening line, for example, a score line or a perforation. The identification card may then be printed in two sections with information printed on opposite sides of the score line along one side of the identification card. The two sections may be printed substantially simultaneously. The identification card may then be folded along the score line to produce a two-sided identification card.

Another type of print media is a two-sided perforated card stock. The card stock may include one or more outlines of identification cards. The identification cards may include a score line substantially centered along one direction. The card stock may be printed on one side only or opposite sides. The identification cards may be punched-out from the card stock and folded along the score line to produce a two-sided identification card. In other words, two sections separated by a score line are printed by passing the sheet through a printer one time to print on both sections.

Another type of print media may be a label that includes adhesive and a removable liner. The label may be die-cut to form one or more identification cards having any desired shape. Preferably, the identification cards have a score line substantially centered along one direction thereof to form two panels. The two panels may be printed substantially simultaneously. The identification cards that include the label and adhesive may be removed from the liner. The two panels of the identification cards may be folded along the score line substantially on top of one another. Alternatively, the two panels may be folded onto opposite sides of a base to form a two-sided identification card.

Other types of print media include label-type as are known in the art, glow-in-the-dark, holographic, electronic, pre-designed, etc. The holographic identification cards may include a holographic image that may be formed into one area of the identification card. The electronic identification cards may include a printable material that enables an image to flash on and off or change for visibility. The material may be powered by a battery and may include features, such as a visible time clock, changing display over time, and expiration notification. The glow-in-the-dark, holographic, electronic, and pre-designed identification cards may be, for example, a label or card that may be offered in a variety of sheet sizes or die-cut configurations.

In a further aspect, the invention is of a label sheet comprising a liner sheet; a paper facestock sheet die cut to define two approximately symmetrical sections; an adhesive layer and a release coating layer disposed between the liner sheet and the paper facestock sheet; and an identification photograph such as a photograph of a human face printed on one or two of the sections of facestock; and wherein the two facestock sections have a line formed therebetween for facilitating folding along the line. The laminate construction including the facestock is preferably of less than a full size sheet, such as a 4×6 inch sheet or a 3×5 inch sheet or their European equivalents. The two facestock sections can further have die cuts formed therein to facilitate punching out of symmetric holes in the two sections so that the facestock sections, once separated from the liner and folded together, can be hung from a lanyard or a badge clip. It is not necessary that the two sections by exactly symmetrical.

Another type of media which may be used is a unique two-sided self-laminating card comprising: a liner sheet comprising a light-transmitting material such as clear, transparent, or translucent plastic, the liner sheet having separation lines therein defining a plurality of connected liner panels and a remaining liner sheet portion; a printable facestock sheet such as a paper facestock sheet adhered to the liner sheet, the facestock sheet having separation lines therein defining two facestock panels adhered to respective ones of the liner panels; the construction being feedable through a printer such that the two facestock panels may be printed thereon in a single pass through the printer to form two printed faces; the liner sheet panels being removable from the remaining liner sheet portion to a separated position in which the two facestock panels remain adhered to the respective ones of the liner panels; the construction being thereafter foldable such that the two facestock panels are disposed back-to-back with the printed faces facing outward from each other, and the liner sheet panels are folded to encompass and protect the printed faces and adhere adhesively to each other, thereby defining a double-sided laminated card.

In another aspect, the invention is of a construction comprising a facestock label assembly including: a first label, a second label and a fold mechanism between them; an adhesive on a back side of the facestock label assembly; a liner panel adhered with the adhesive to the first label; with the label assembly being folded on the fold mechanism and the first and second labels being adhered together by the adhesive and disposed back-to-back with at least the liner panel disposed therebetween.

In a further aspect, the invention is of an identification badge construction comprising: a liner sheet; a facestock sheet made of a flexible and printable material, the facestock sheet being releasably adhered to the liner sheet which may be smaller in size than both 8½ inches×11 inches and 21 cm×29.7 cm; the facestock sheet being die cut to form first and second identification badge sections connected together along a weakened line to facilitate folding, such that after printing thereon the two label badge sections may be peeled from the liner sheet and folded together along the weakened line to create a two-sided identification badge.

In a still further aspect, the invention is of an identification badge construction comprising: a liner sheet which may be smaller in size than a standard sheet of paper or even smaller in size than 18 cm×12 cm; a facestock sheet made of a flexible and printable material releasably adhered to the liner sheet; the facestock sheet being die cut to define therein a single identification badge section; and the construction being fed into a printer for printing identification badge indicia including a photograph for exactly one identification badge onto said single identification badge section, such that after printing the identification badge section may be peeled away from the construction to define a single photographic identification badge.

In a still further aspect, the invention is of a security feature to help reduce the ease by which any of the identification badges made possible by the present invention are counterfeited. In this aspect, a mark such as a company logo or other security mark is preprinted onto the liner panel adhered with adhesive to the first area of the facestock, such that when the facestock is separated from the release liner and folded over onto itself such that a second area of the facestock is adhered over the liner panel having the preprinted mark, the mark remains at least partially visible through the second facestock portion.

Using the invention a visitor to a facility can enter into a computer such as a personal computer having an easy to use interface the visitor's name, a camera such as a web camera can take the visitor's photograph as initiated by the visitor, and the visitor can himself or herself feed the media stock into a standard printer such as an ink jet printer, color laser printer, direct thermal printer, or the like, electronically connected to the personal computer, in order to create his or her own photo ID badge quickly and using inexpensive media. In this way the burden of logging in visitors and creating photographic identification badges is greatly reduced, and is shifted to the visitor using inexpensive hardware and media. One example of such a system would be for use in convention registration, in which many stations could be provided for convention attendees to log themselves in and create their own photographic convention badges without the need and expense for many hired system operators. Another example would be for use by visitors to a secure or semi-secure facility.

Other advantages of the present invention will become more apparent to those persons having ordinary skill in the art to which the present invention pertains from the foregoing description taken in conjunction with the accompanying drawings.

BRIEF DESCRIPTION OF THE DRAWINGS

FIG. 10 is a front view of a third label sheet construction;

FIG. 10a is an enlarged cross-sectional view taken on line 10a-10a of FIG. 10;

FIGS. 10b, 11 and 11a show successive assembly steps for the construction of FIG. 10;

FIG. 12 is a first alternative of the embodiment of FIG. 10;

FIG. 13 is a second alternative;

FIG. 29 is a front view of a sixth label sheet construction;

FIG. 29a is an enlarged cross-sectional view taken on line 29a-29a of FIG. 29;

FIGS. 29b, 30, 30a and 31 show successive assembly steps of the construction of FIG. 29;

FIG. 35 is a front view of a seventh label sheet construction;

FIGS. 36, 37 and 38 show successive assembly steps of the construction of FIG. 35;

FIG. 67 shows a prior art badge holder;

FIG. 68 illustrates a badge showing a unique hole design for use with the badge holder of FIG. 67;

FIG. 69 is a close-up of the badge hole illustrated in FIG. 68;

DETAILED DESCRIPTION OF PREFERRED EMBODIMENTS

Figure 2:
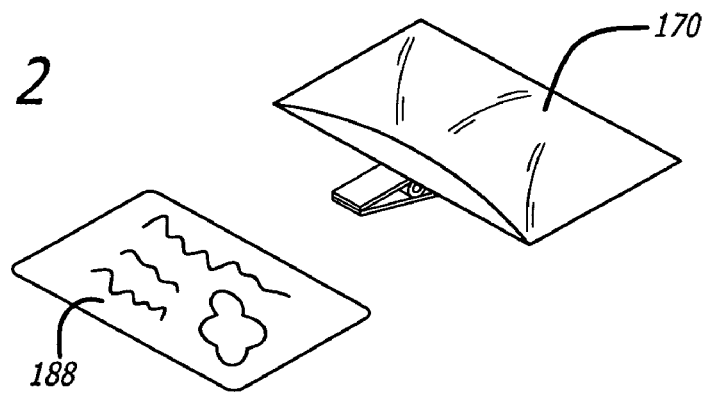
FIG. 2 is a perspective view of a printed two-sided label assembly of the present invention being inserted into a clipped clear plastic holder.
Figure 3:
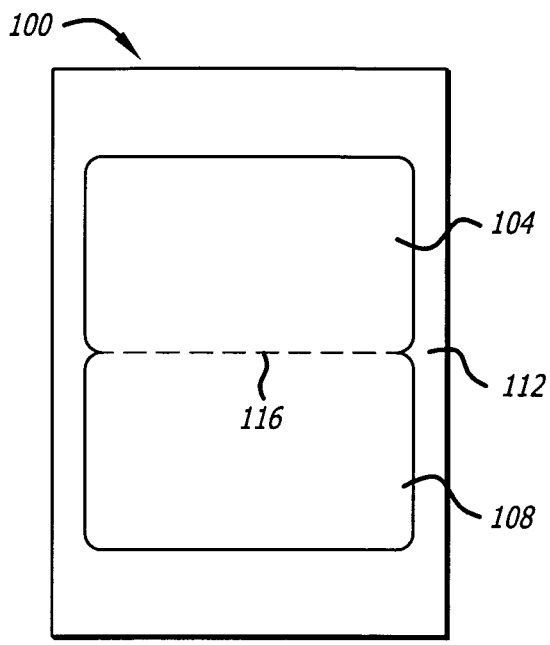
FIG. 3 is a front view of a first label sheet construction of the present invention.
Figure 4:
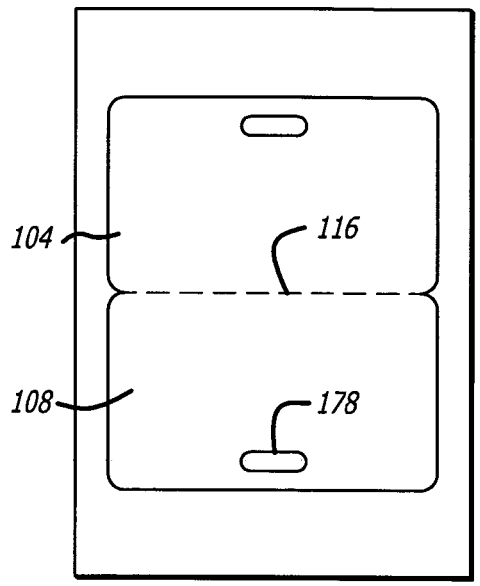
FIG. 4 is a first alternative of the embodiment of FIG. 3.
Figure 5:
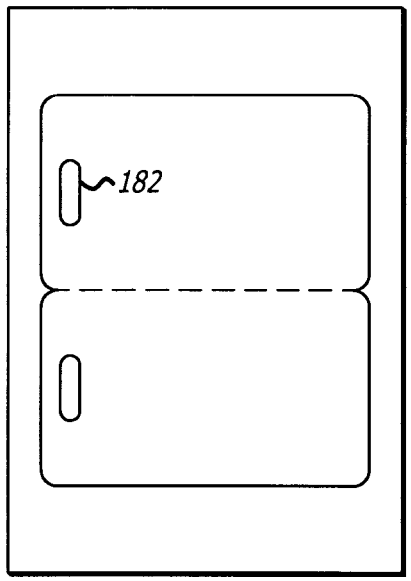
FIG. 5 is a second alternative.

Referring to FIG. 3, a first embodiment of the present invention shown generally at 100 includes two adjacent badge size labels 104, 108 on a sheet 112, attached at the joining point by a perforation 116. This embodiment can be made of a facestock 120, adhesive 130 and a silicone coated liner 140 in FIG. 6a and can be used in different ways. The first way is that after it has been printed upon such as by a printer or a copier 150 (see FIG. 1), it can be removed from the carrier sheet and simply folded at the perforation 116. This provides a two layer construction with some of the properties of a card, but it would have been printed with indicia 154 on both sides with a single pass through the printer or copier (see FIG. 1 at 150). This can then be removed and inserted into a carrier, such as shown in FIG. 2 at 170 and as is known in the prior art. The two-sided card can also be suspended from a lanyard 174 (FIG. 51) if holes 178, 182 are included either on the top and bottom or on the sides as shown FIGS. 4 and 5. The printer used can conveniently be an ink jet printer, a color laser printer, a thermal printer, a sublimation printer, or any other personal computer printer or desk top printer. Although the invention is particularly well suited for use with such printers, the invention is not limited to use with such printers.

Figure 51:
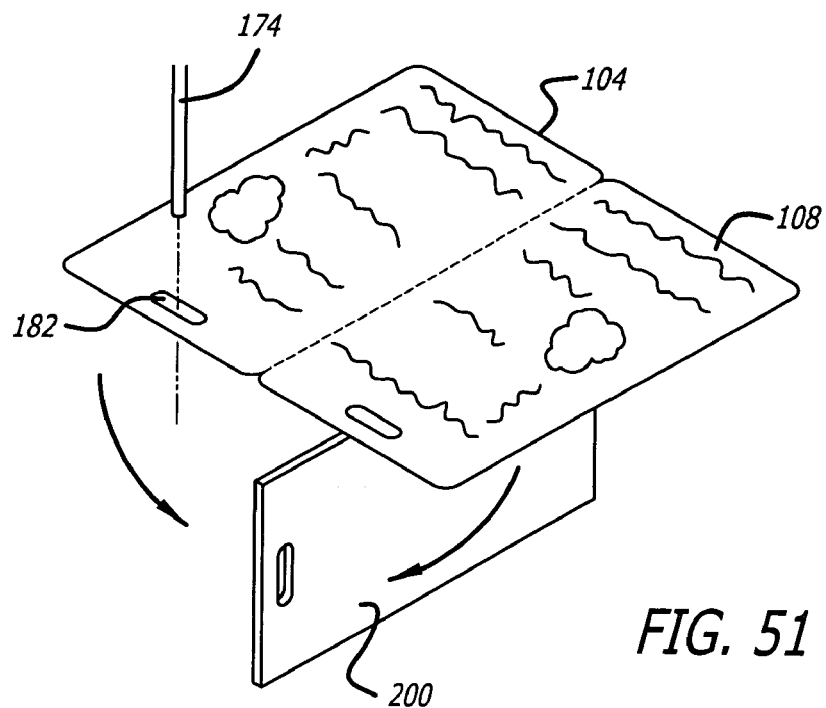
FIG. 51 is a perspective view showing a printed label assembly of the present invention being applied to an RFID card and a lanyard.

Another way for this product to be used is to size the label to be the same size as an RFID card and to wrap the label around the front and back of the RFID card, as shown in FIG. 51 at 200. Depending on the need and method of holding the badge, this can be done either with labels having holes or labels without holes. This would have the advantage of linking the label to the specific RFID card. It can be used with or without a card carrier or hung from a clip or a lanyard 174 without the use of a carrier in the variation with the holes.

Aside from a perforation line 116, an alternative type of weakening line that can be used is a score or a "cut score," which can be created by using a sharp blade but only cutting part of the way through the material. A third type of weakening line is a "crush crease," which uses a blade that has been flattened at the top to create an indentation by crushing the paper fibers at that location. A fourth type of weakening line is a crease, created by a male/female creasing set. The male die blade has a rounded point that is aligned with a groove in the bottom die, and the die creates a "U" shape in the material. These various alternative weakening lines can be used for any of the constructions disclosed herein.

The preferred sizes of the badges 104, 108 are 2¼"×3½" and 3"×4", and the ones that are to be attached to the RFID cards 200 are 2⅛"×3 ⅜".

The badge need not be foldable into a two-sided badge as shown in FIG. 3. The badge stock could be a single sheet of less than full size with a single badge section formed thereon by die cuts in the liner, such that after printing the identification badge section may be peeled away from the construction to a define a single photographic identification badge. In such a construction, the single badge section could have a release layer applied to its backside with the adhesive applied to the liner. Alternatively, the single badge section could have no release layer applied to its backside with the ultra-removable adhesive applied to the liner. Alternatively, the single badge section liner uses "Dry Tack," which uses a non-pressure sensitive adhesive to bond the layers. In this way, when the single badge section is printed and peeled away from its liner the resulting badge is sufficiently non-sticky for placement into a transparent protective sleeve or pocket. Alternatively, the single badge section could have a releasable adhesive applied to its backside such that the badge section, when printed and peeled away from its release-coated liner, will be suitable for use as a photographic identification badge which can be releasably adhered to clothing. Still further, the single badge section could have non-releasable adhesive applied to its backside such that the badge section, when printed and peeled away from its release-coated liner, can be permanently adhered to a substrate. Suitable substrates could include an inexpensive plastic card or an RFID card.

Figure 71:
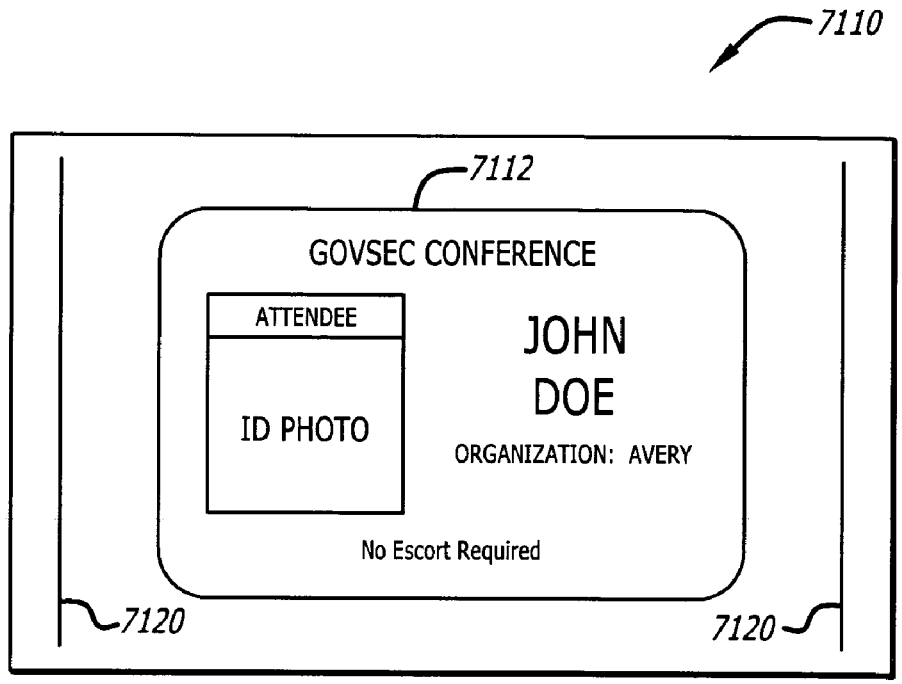
FIG. 71 illustrates an exemplary single sided badge label sheet after being printed.

FIG. 71 illustrates an exemplary stock sheet 7110 for a single sided badge after being printed upon and ready for separation from liner. Because the badge in this example is printed on heavier label stock than is normally used for label applications, the label stock material is preferably modified to allow the badge stock material to be fed through a standard printer such as an ink jet printer or color laser printer without jamming. In FIG. 71, weakened separation lines 7120 through the facestock material have been added near each end of the stock sheet, but not passing through the badge portion 7112 of the facestock. Weakened line 7120 can be, for example, a die cut that extends through more than 90 percent of one facestock dimension near an edge of the badge which may be fed into the printer first. In this case, the die cut in the thick facestock extends nearly from the top to the bottom of the stock material near each side edge of the stock, but does not extend all the through to either the top or the bottom edges of the facestock. In this orientation, the side edge of the card will be fed into the printer first. This allows the side edge of the badge, which will be fed first into the printer, to curl more easily as the stock material is guided along the curved printing path within the printer, thus helping to avoid paper jams in the printer. At the same time, the ties at the top and bottom of the facestock help prevent the facestock from separating from the liner along weakened line 7120. Alternately, if the Clean Edge material is used, a section of the liner, with either the dry tack or removable adhesive bonded to the liner, may be removed from either end, so that the first section, preferably the first approximately ⅜", of the first edge to pass through the printer consists of the Clean Edge face material only.

In FIG. 3 the two badge sections formed of printable facestock material are shown as symmetrical. They need not be strictly symmetrical. The two facestock sections can be approximately symmetrical such as by differing in their shapes and/or surface areas by less than 5 percent, less than 10 percent, and/or less than 20 percent and still fall within the spirit and scope of the present invention. An example of an approximately but no strictly symmetrical pair of badge sections is shown in FIG. 6.

An alternative embodiment uses a construction such as the CLEAN EDGE construction disclosed in the above-mentioned international publication. Although this construction is preferably designed for business cards, it can also be adapted for the present construction. The present construction can be an inverted pressure-sensitive removable adhesive construction where one die cuts and prints on the liner side and the adhesive side acts as the liner. An alternative embodiment of this construction uses a non-pressure sensitive adhesive that preferentially bonds to the back side of the construction. The cards are die cut in any of the die configurations of FIGS. 3-5. After printing, the card is removed and folded over on itself as shown in FIG. 2 at 188. This folded card 188 can then be placed into a clear carrier 170 (FIG. 2) that can be attached to a lanyard 174 or a clip.

Figure 72:
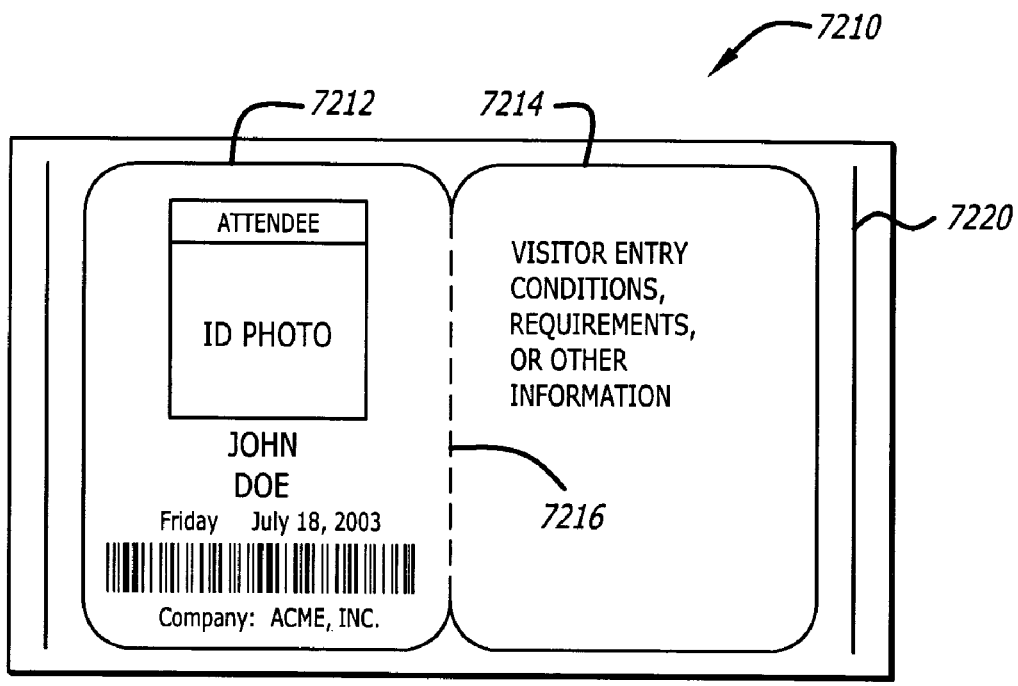
FIG. 72 illustrates an exemplary two-sided badge label sheet after being printed.

FIG. 72 illustrates an exemplary two-sided badge sheet 7210 after being printed upon, with the badge comprising the first badge section 7212 and second badge section 7214 ready for separation from liner. The two badge sections are separated by a line such as perforation line 7216 or other fold line for folding along. The illustrative badge shown includes an identification photograph of a person's face, the person's name, the person's entry time into the facility, and the person's company printed on the first badge portion 7212, and visitor entry conditions, requirements, and/or other information printed on the second badge portion 7214. After the badge sections are peeled away from the liner they can be folded back on one another along fold line 7216 to form a two-sided badge. Alternatively, the identification photograph may be printed on both badge portions 7212 and 7214, such that the two-sided badge contains the visitor's photograph on both sides. In this way, regardless of whether the badge gets turned over in use such as is often occurs when hanging from a lanyard, the visitor's identification photograph will always be visible. Many variations are possible, including variations previously discussed with respect to other embodiments. The two-sided badge stock preferably has weakened lines 7220 such as die cuts preferably along each side edge that may be fed into the printer first, similar to the weakened lines described in greater detail in connection with FIG. 71.

Figure 6:
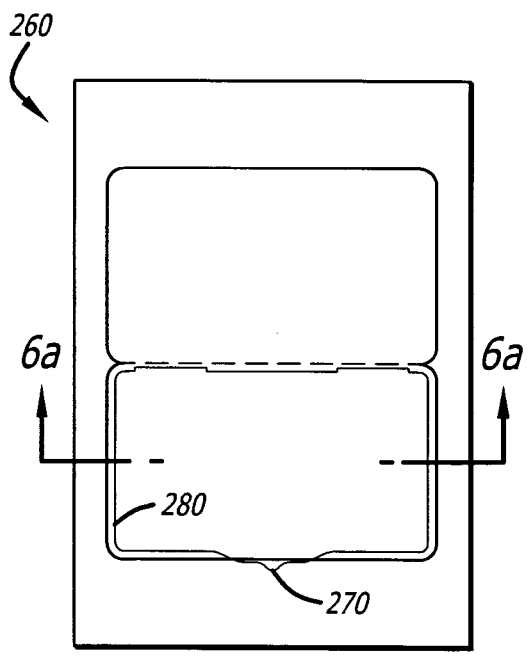
FIG. 6 is a third alternative.
Figure 6A:
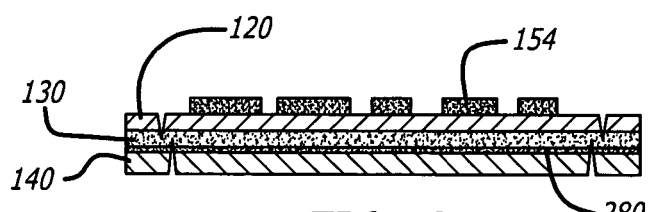
FIG. 6a is an enlarged cross-sectional view taken on line 6a-6a of FIG. 6.

A further embodiment of this invention as shown generally at 260 in FIG. 6 incorporates a die-cut liner section 280 underneath one section of the label. This die cut section provides a surface that is adhesive free to align an RFID card 200 prior to application. The user aligns the section with the liner to the RFID card, and the second part is then folded onto the card. The liner section is then applied by removing the liner and folding it back onto the RFID card. The liner has a tab 270 that extends beyond the face and is created when the label is removed from the sheet to make it easier to remove the liner prior to application.

The preferred materials used vary with the embodiment. For example, the embodiment of FIG. 3 preferably uses standard paper label stock (die cut in any of the three configurations shown). An alternative material is the CLEAN EDGE technology described in the above-incorporated PCT document incorporating either a "dry tack" which employs a non-pressure sensitive adhesive to bond the layers, or an ultra-removable adhesive. A further variation is constructed of standard label stock only.

The invention disclosures of FIGS. 7-50 can all use the same general construction, and can use the same material currently used for commercially-available self-laminating badges, such as the "Laminated ID Cards" badges available from Avery Dennison Corporation. The liner is preferably a heavy paper or card stock. It is silicone coated, adhesive coated, and has a transparent film on the top layer. An additional laminate on one half of the sheet can be used as described later in this disclosure. This additional laminate (starting from the transparent film to which it is applied) is either composed of an adhesive and a release coated liner, or it can be an adhesive, a film or paper intermediate layer, a second adhesive coating (essentially double-sided tape), and then the silicone coated liner (illustrated from the top view as a cross hatched area in the drawings).

The embodiments of any of the label or card product embodiments of any of one or more of the alternatives described herein can be printed advantageously on both sides thereof by a single pass through a printer or copier 150 (or less desirably can be handprinted). The user can have identical information printed on both sides for clear visibility or print other information such as company logo, mission statement, visitor policy, safety regulations and so forth as a way of using the badge to convey additional information. The two-sided badge 188 can be placed in a clear sleeve 170 (see FIG. 2) or suspended from a lanyard (see FIG. 51) or attached to a clip and can be viewed from both sides. The two-sided badge embodiments that have a hole (see, e.g., FIGS. 4 and 5) can be used on a lanyard or a strap clip without a sleeve. The badge labels as previously mentioned can be used with or without RFID cards 200. They can be applied directly to the cards (the label stock) or placed around the card in a clear sleeve (card stock).

The inventions described herein allow the application of inkjet and/or laser printable label to an RFID card 200. A liner tab extension embodiment can be used alternatively, as shown in FIG. 6. A split back liner can be provided to help align the two sided label to an RFID card. The two-sided die cut label can be used to wrap around an RFID card as a feature of the present invention.

Figure 7:
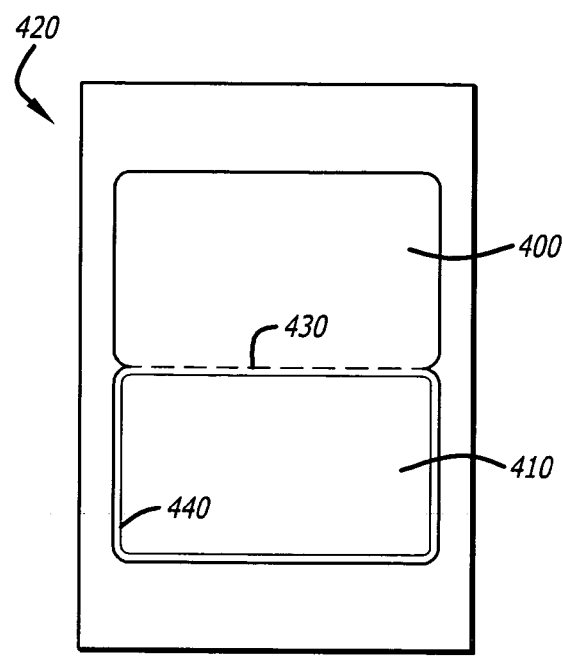
FIG. 7 is a front view of a second label sheet construction of the present invention.

A further embodiment of the invention includes adjacent badge size labels 400, 410 on a sheet 420, attached at the joining point by a perforation 430 with a badge cutout on the liner, as shown in FIG. 7 generally at 440. See also U.S. Pat. Nos. 5,662,976 and 6,159,570.

Figure 8:
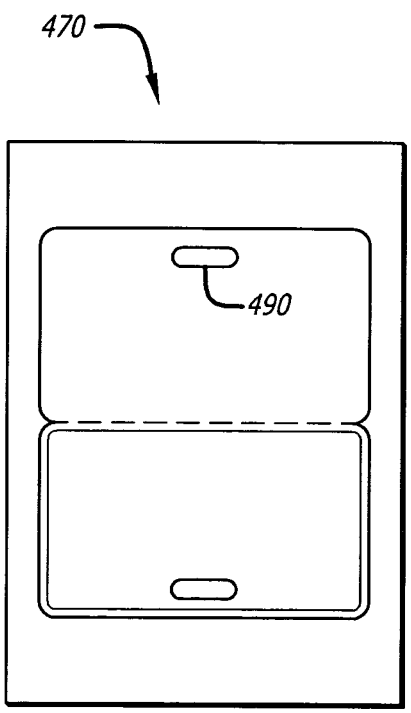
FIG. 8 is a first alternative of the embodiment of FIG. 7.
Figure 9:
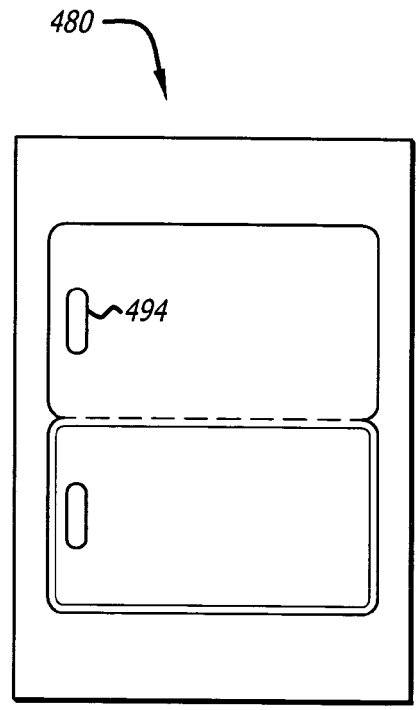
FIG. 9 is a second alternative.

This embodiment can be made of clear film facestock and adhesive and silicone coated liner. Once the assembly has been printed on the liner side, as by passing through a printer or copier (see FIG. 1 at 150), the printed portion of the liner and the two clear film badge-shaped sections separated by a perforation and adhered by adhesive to the printed portion of the liner can be removed from the carrier sheet and folded at the perforation 430. This provides a self-laminated card printed on one side thereof, which can then be inserted into a badge holder or the like (see FIG. 2 at 170), or alternately, adhered to a badge clip with a self adhesive patch. First and second alternative embodiments of the invention of FIG. 7 are shown in FIGS. 8 and 9, generally at 470 and 480. These two alternative embodiments have hole sections 490, 494 that can be removed allowing the badge to be attached to a clip or lanyard.

A third embodiment shown generally at 500 in FIG. 10 is designed to be applied to one side of an RFID card 200 or some similar device such as depicted in FIG. 51. This embodiment would be printed on the liner side 510 in an inkjet or laser printer as can be understood from FIG. 10a. The printed liner section 520 can be removed, flipped over, as shown in FIG. 10b, and reinserted into the area from which it was removed, as can be understood from FIG. 11 at 530. The printed indicia 534 is visible through the transparent film 538. The entire center section 540 can then be removed, as shown in FIG. 11a, and applied to an RFID card, as the exposed adhesive area 550 around the centered printed card bonds the center section to the RFID card or other device.

First and second alternative embodiments to construction shown in FIG. 10 are shown in FIGS. 12 and 13, at 580 and 590, respectively. They can have hanger holes 600, 604 that are cut through the face and liner and are attached by breakable ties. These can be removed before or after application to the RFID cards (or similar devices) allowing the assembly to be attached to a clip or lanyard.

Figure 16:
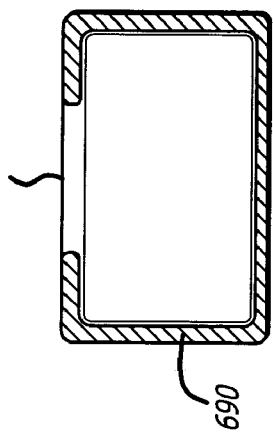
FIGS. 15 and 16 show successive assembly steps for the construction of FIG. 14.
Figure 15:
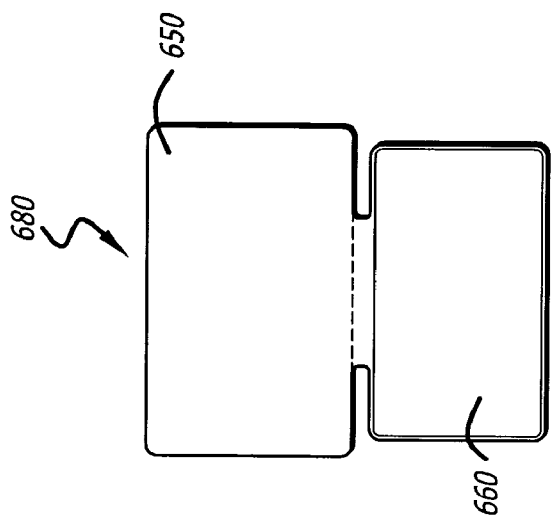
Figure 14:
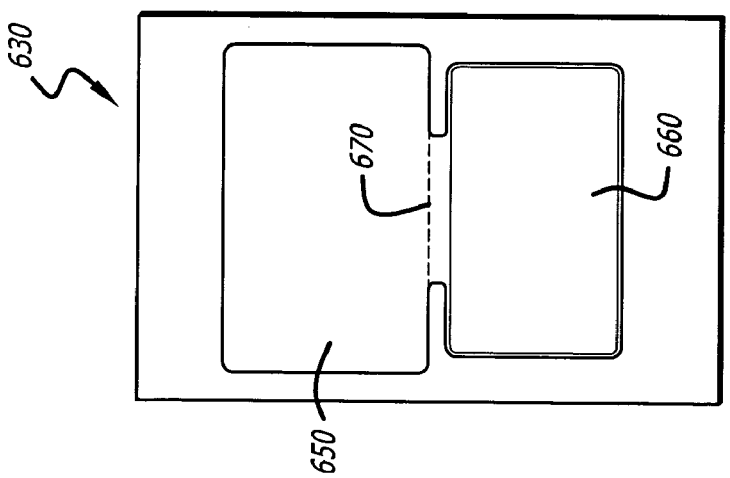
FIG. 14 is a front view of a fourth label sheet construction.

A fourth label sheet construction shown generally at 630 in FIG. 14 includes a die cut liner section underneath one of two asymmetrical sections 650, 660 of the label attached by a perforation 670. This can be made from a clear face, a silicone coated paper liner and an adhesive layer in the center. After printing on the liner side in an inkjet or laser printer such as the printer shown in FIG. 1, the assembly 680 is removed from the carrier, as shown in FIG. 15, and folded at the perforation 670, as shown in FIG. 16. This provides a perimeter that has exposed adhesive 690 except in the hinge area 694. This can be applied to an RFID card or similar device or surface.

Figure 19:
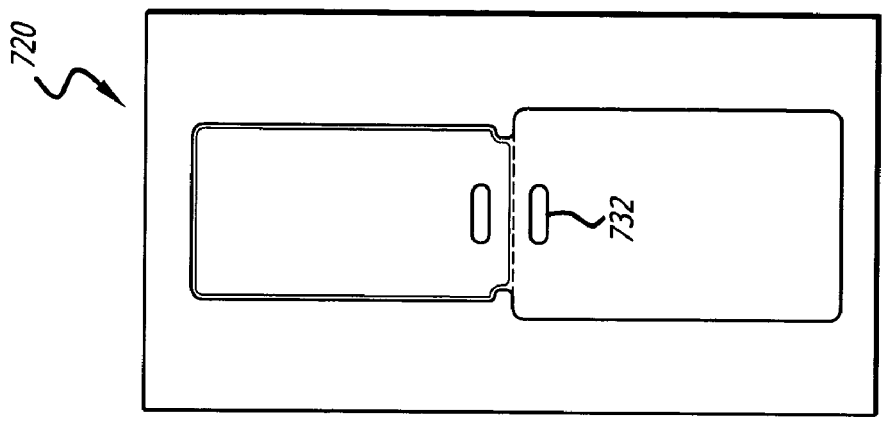
FIGS. 17, 18 and 19 are first, second and third alternatives of the construction of FIG. 16.
Figure 18:
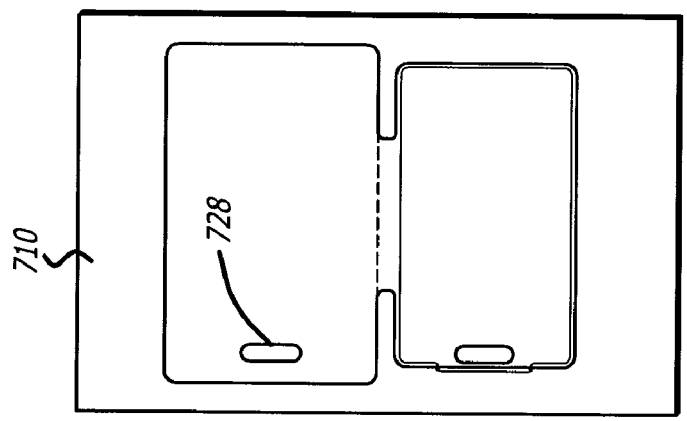
Figure 17:
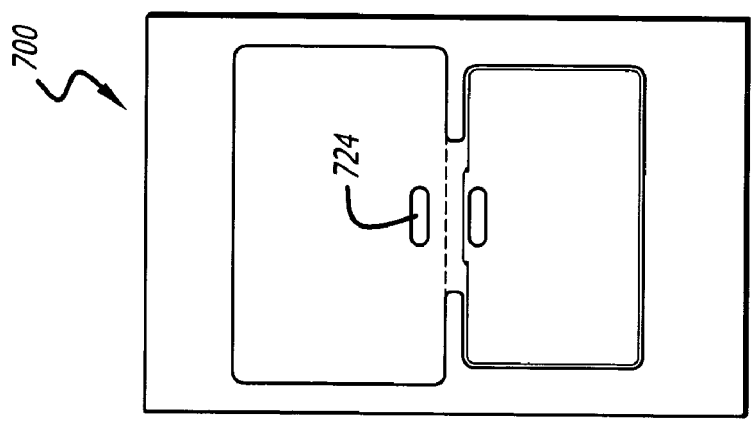

First, second and third alternatives of the construction of FIG. 16, as shown generally at 700, 710, 720 in FIGS. 17, 18 and 19, respectively, can be designed and utilized. They would also incorporate holes 724, 728, 732 so that the assembly with an RFID card or other device can be attached to a clip or lanyard.

Figure 20:
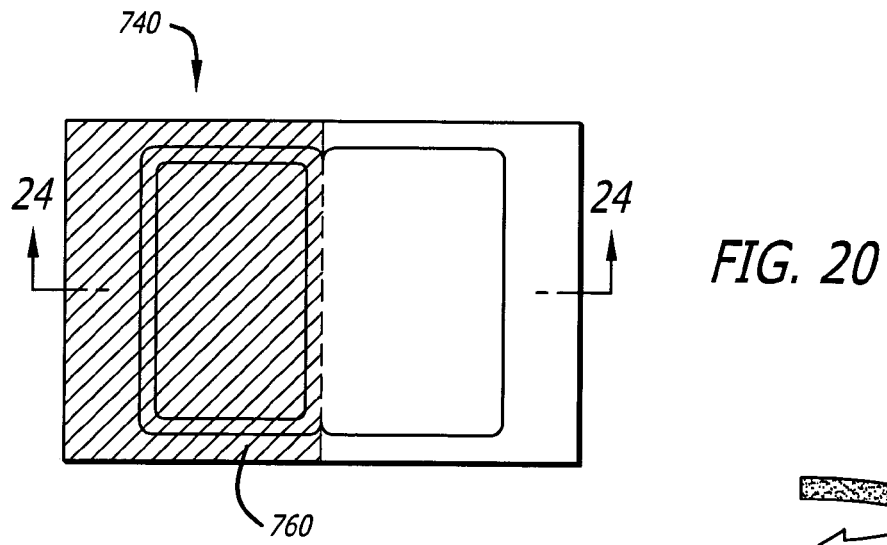
FIG. 20 is a front view of a fifth label sheet construction.
Figure 21:
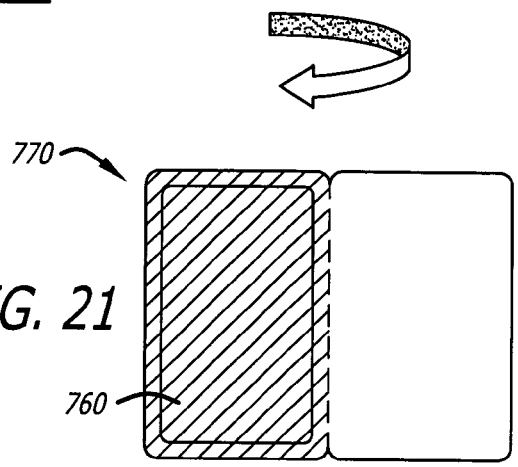
FIGS. 21, 22 and 23 show successive assembly steps of the construction of FIG. 20.
Figure 22:
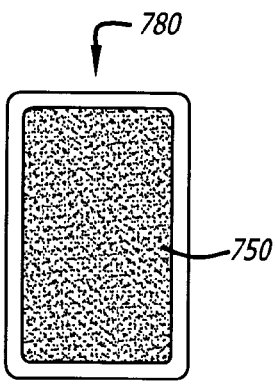
Figure 23:
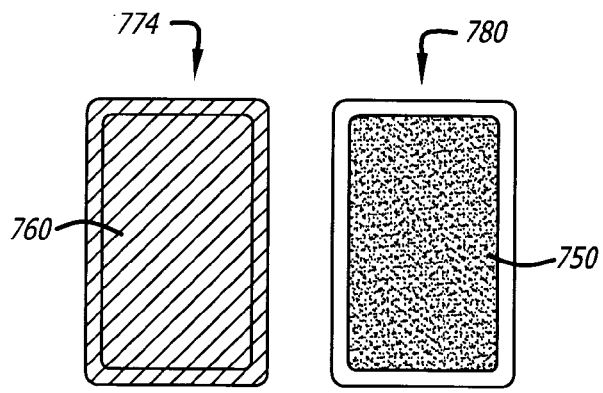
Figure 24:
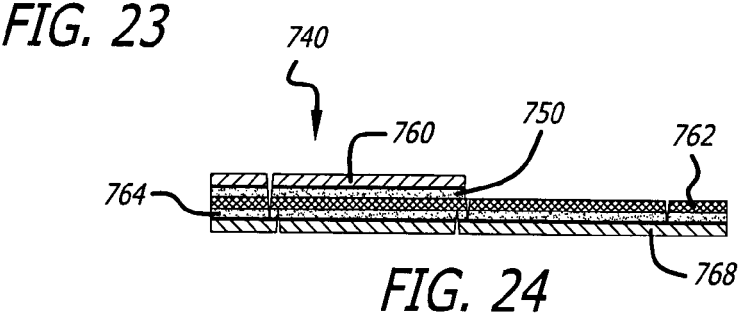
FIG. 24 is an enlarged cross-sectional view taken on line 24-24 of FIG. 20.
Figure 27:
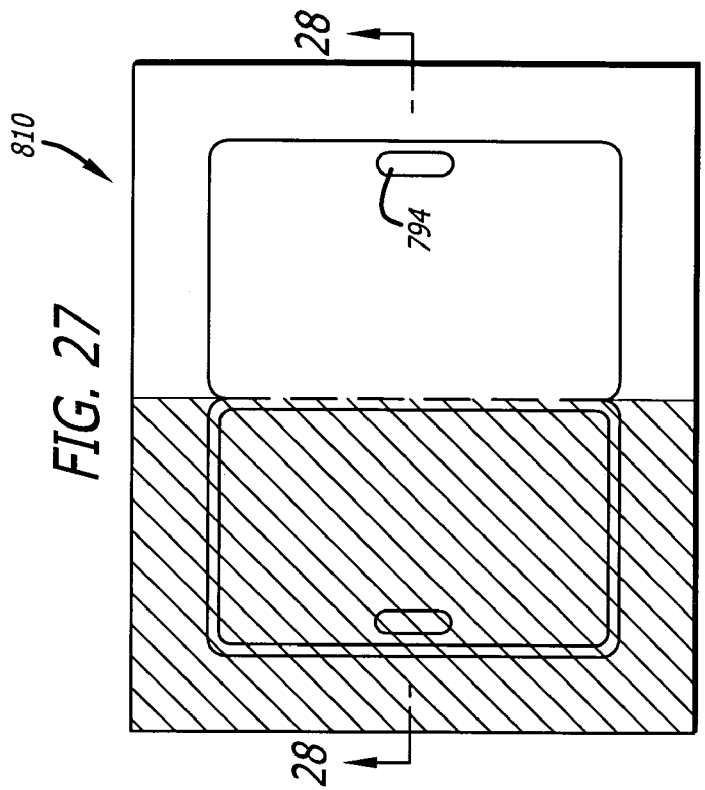
FIG. 27 is a second alternative of the construction of FIG. 20.
Figure 28:
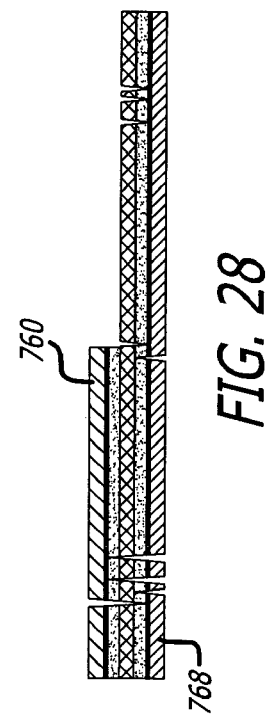
FIG. 28 is an enlarged cross-sectional view taken on line 28-28 of FIG. 25.
Figure 25:
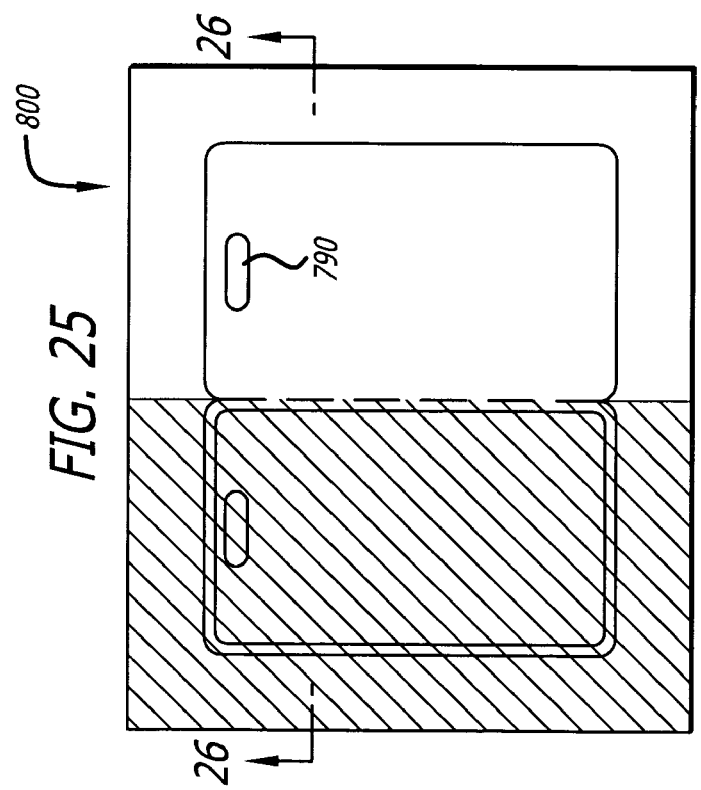
FIG. 25 is a first alternative of the construction of FIG. 20.
Figure 26:
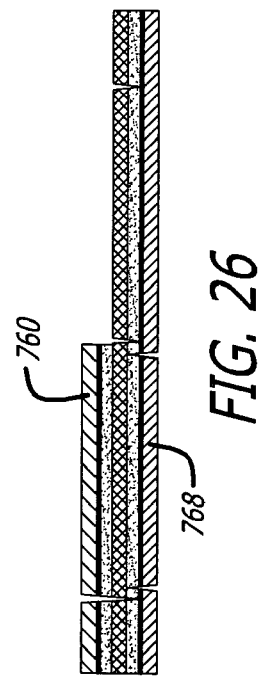
FIG. 26 is an enlarged cross-sectional view taken on line 26-26 of FIG. 25.

A fifth label sheet construction of the present invention as shown in FIGS. 20 and 24 at 740, incorporates an additional layer of adhesive 750 and silicone coated liner 760 on one half of the sheet, applied to the top surface of a clear film 762, adhesive 764, and silicone coated liner 768 laminate. See FIG. 24. The user prints on the back side of the construction 740, removes the assembly 770 from the sheet, as shown in FIG. 21, and folds the clear half onto the printed indicia on the liner side, as illustrated in FIG. 22 at 774. The user then removes the top layer of liner 760, as shown in FIG. 23, to expose the adhesive 750 and next applies the one-sided label 780 to an RFID card or similar device.

Alternative embodiments of the present invention are the same in form and function as that of the construction of FIG. 20, but have holes 790, 794 coincident with holes in the RFID card and which allow the complete assembly to be attached to a clip or lanyard. The first alternative embodiment is shown at 800 by FIGS. 25 and 26, and the second alternative embodiment is shown at 810 by FIGS. 27 and 28.

Figure 1:
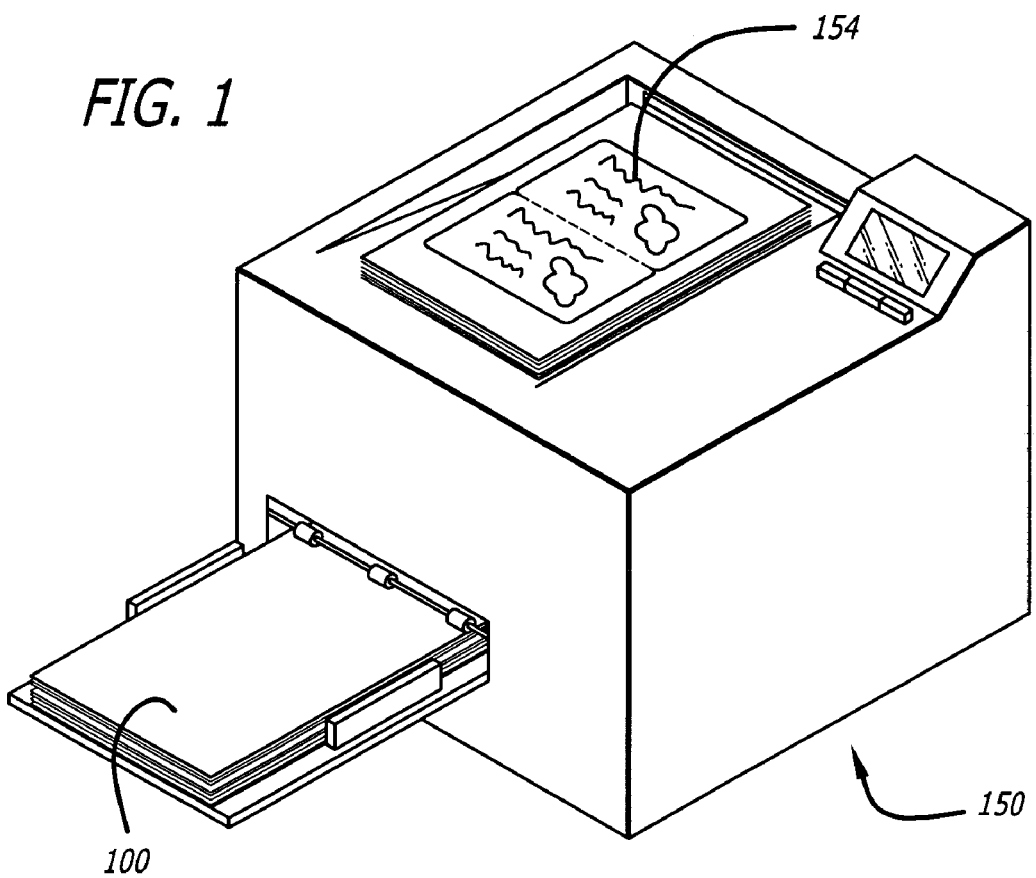
FIG. 1 is a perspective view of a printer or copier showing a stack of label sheet constructions of the present invention being fed and passed therethrough and desired indicia printed on the label assemblies thereof.

The embodiments of FIGS. 7-9 provide a self-sealing printable badge on which the user can print an image (or other indicia) in an inkjet or laser printer, such as shown generically in FIG. 1, which then can be removed from the carrier sheet and covered and protected on both sides by clear portions of the assembly. This provides a complete, durable badge that can be placed in a badge holder or in the case of embodiments of FIGS. 8 and 9, attached directly to a clip or lanyard.

The embodiments of FIGS. 10-28 provide a printable badge on which the user can print an image in an inkjet or laser printer, which then can be removed from the carrier sheet and covered and protected on the printed side by a clear portion of the assembly. The assembly with the printed badge and clear overlaminate would have an area on the underside, either partial or complete, where there is exposed adhesive, so that the assembly can be applied and adhered to a secondary device such as an RFID card. This provides a complete, durable badge assembly that can be placed in a badge holder such as shown in FIG. 2, or in the case of embodiments with holes attached directly to a clip or lanyard such as shown in FIG. 51.

The embodiments discussed above have a number of advantages over the prior art. They provide protected printed badges that are water resistant, scratch resistant and unmodifiable once assembled. The protected badges are printable in an inkjet or laser printer and do not require specialized printers as is the norm in the industry today. The printable badges can be easily applied to one side of an RFID card or similar device. The printable badges can be provided in a 4×6 inch format that can be printed one at a time. The printable badges use materials that are lower in cost than industry standard PVC cards. Some of the embodiments of FIGS. 7-9 provide a complete laminated badge with or without hanger holes for clips or lanyards. The embodiments of FIGS. 10-13 are simple to make, simple to use and provide an adhesive area around the entire perimeter of the badge.

The embodiments of FIGS. 14-19 are simple to use and provide an adhesive area around most of their perimeters. In the case of the badge with the holes on the long side such as in FIG. 18, the area without adhesive is the same area that will be attached to a clip or lanyard, and is therefore protected from potential delamination by the clip or lanyard attachment. Although the variation of FIG. 18 has the unadhered area on the side, the variation of FIG. 19 provides the same benefit as FIG. 17, only in the long direction.

The alternative embodiments of FIGS. 20-28 provide full adhesive coverage on the back side of the badge, providing for secure attachment.

The embodiment of FIG. 10, for example, is advantageous over the prior art and particularly U.S. Pat. No. 6,284,708 at least for the following reasons. The receiving layer of the '708 patent is not inherently an adhesive so adhesive must be applied either to the image surface after printing but before transfer, or the adhesive must be applied to the surface to which the image material is to be applied. This is an extra step that requires specialized equipment and is more applicable to industrial rather than consumer environments. In contrast, the present invention is printed on the backside, then the die cut liner section is removed and flipped over and reinserted into the hole. This whole section is separated from the base sheet at the film face cut and applied to a separate surface. This provides an opaque (white) surface on which the image is printed, which may be applied to surfaces that are dark colors or patterned, without degrading the visibility of the printed image. It also provides a clear adhesive border around the perimeter of the sheet, so that it can be bonded to any relatively smooth surface without any additional adhesive coating steps required, thereby protecting the image area from environmental damage.

Further, the present invention is suitable for use in an inkjet printer and in a hand application. The '708 patent is more suitable for automatic application using applying equipment. If adhesive is applied to the printed die cut shapes after printing, they are suitable for hand removal after the substrate. If the surface to which the image is applied is to be adhesive coated, hand alignment will likely leave exposed adhesive or areas where there is no adhesive bond.

Matrix stripping around the die cut image areas of the '708 patent leaves a "liner" with exposed adhesive on the top surface around the die cut images. This complicates handling and disposal. In contrast, the present invention leaves no exposed adhesive in the unused section.

Referring to FIG. 29, a sixth label sheet construction 900 of this invention is constructed of a laminate composed of a clear film 920, an adhesive layer 930 and a release coated liner 940, as can be understood from FIG. 29*a*. The face cut consists of two adjacent name-badge sized labels 950, 960 on a sheet, attached to the joining point by a perforation 970. This embodiment is designed to be used independently or applied to two sides of an RFID card or some similar device, such as shown in FIG. 51. It can be printed on the liner side in an inkjet or laser printer, such as shown in FIG. 1. The printed liner sections are removed (see FIG. 29*b* at 980, 984), flipped over and reinserted into the areas from which they were removed (FIG. 30 at 988). The entire center section 990 is removed (FIG. 30*a*) and folded over onto itself to form an independent, sealed two-sided badge (FIG. 31 at 994), or applied to an RFID card, as the exposed adhesive area 998 around the center printed cards can bond the device to the RFID card or other device.

Figure 34:
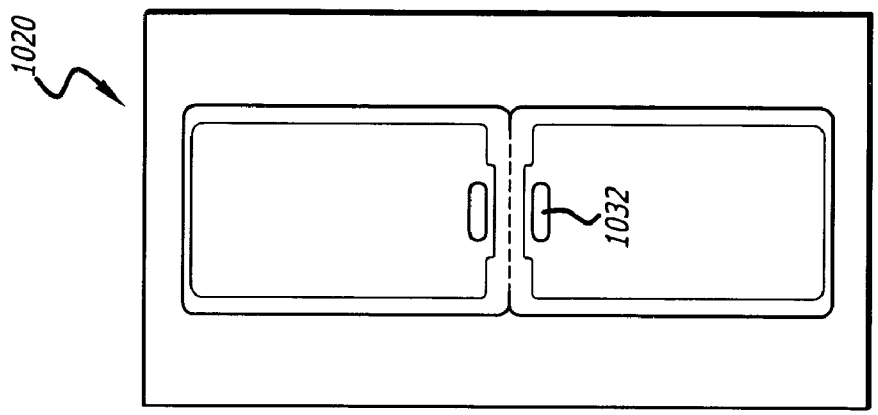
FIGS. 32, 33 and 34 are first, second and third alternatives of the construction of FIG. 29.
Figure 33:
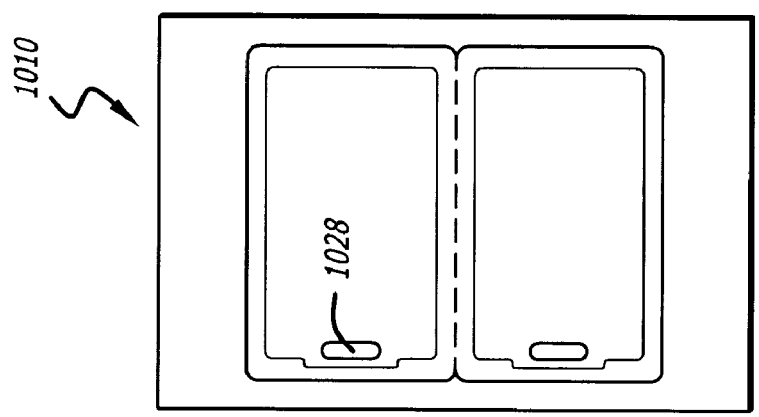
Figure 32:
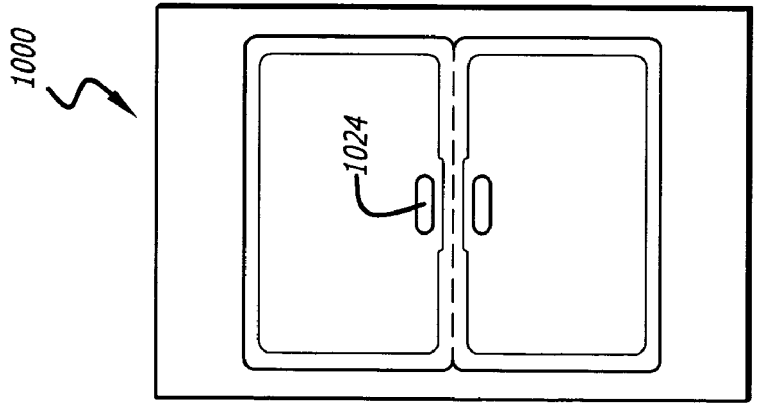

Alternative embodiments of the invention of FIG. 29 are shown in FIGS. 32, 33 and 34 at 1000, 1010 and 1020. These embodiments have hanger holes 1024, 1028, 1032 that are cut through the face and liner and are attached by breakable ties. These can form independent two-sided badges or can be applied to an RFID card or similar device. The hanger holes can be removed before or after formation or application to the RFID cards, along the assembly to be attached to a clip or lanyard.

Figure 39:
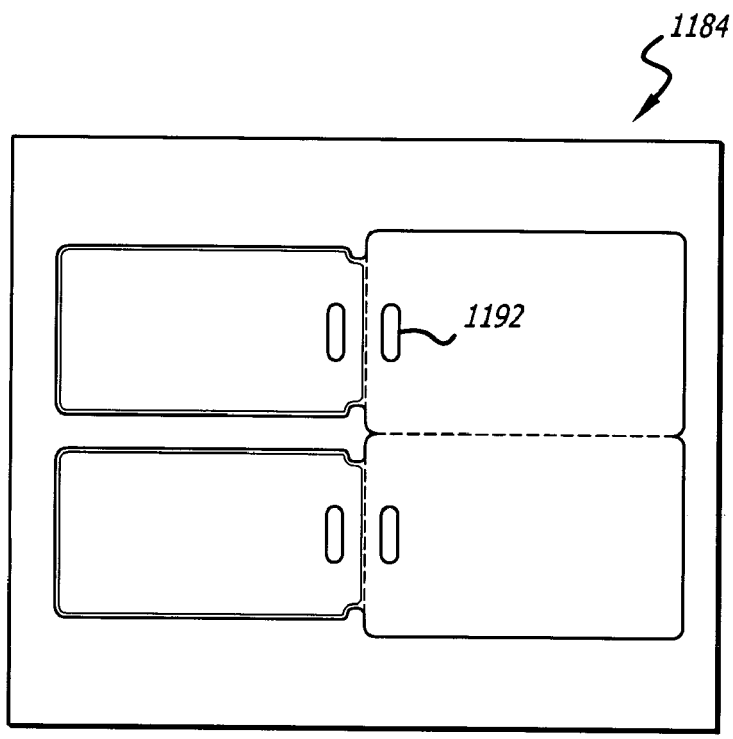
FIGS. 39 and 40 are first and second alternatives of the construction of FIG. 35.
Figure 40:
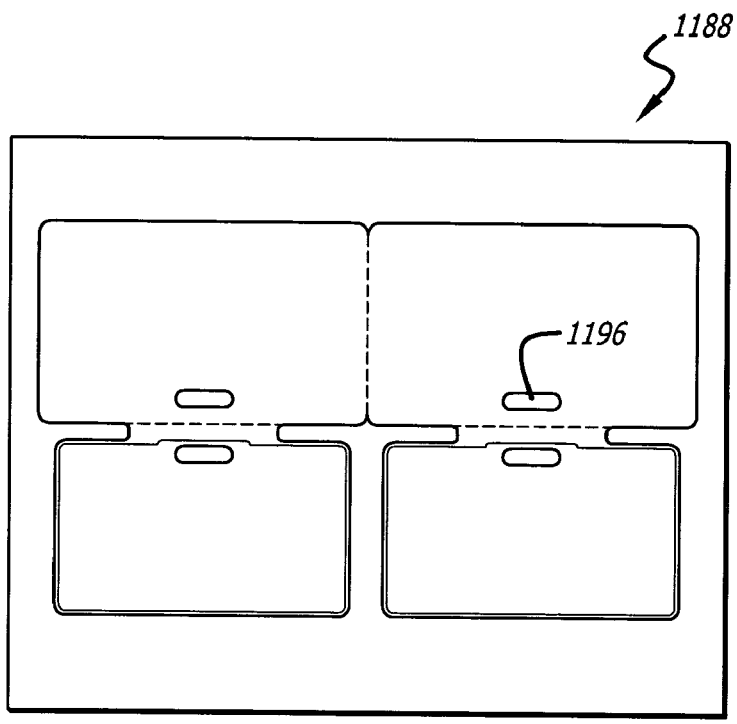

A seventh label sheet construction is shown in FIG. 35 generally at 1100, and is made from a clear face, a release coated paper liner, and an adhesive layer in the center. The assembly is shown in FIG. 35 after having indicia printed on two facestock panels. The two facestock label panels are adhered over first and second liner panels, respectively which are approximately the same size as the facestock sections or slightly larger. Third and fourth liner panels are shown in phantom. The liner panel may be clear, transparent, or even translucent, but in any event light-transmitting to at least some extent. In FIG. 36, the assembly that will constitute the ID badge has been removed from remainder of the sheet, i.e., the waste portion of the sheet. Third and fourth liner panels 1112 are now visible. Those visible side panels 1112 are their sticky sides. The first liner panel which has the first facestock panel adhered thereto is connected to the third line panel via a hinge portion 1170 of the liner sheet, and the second liner panel which has the second facestock panel adhered thereto is connected to the fourth liner panel by a corresponding hinge portion. In FIG. 37, the assembly is shown with the facestock labels 1110 having been folded against liner panels 1112. The indicia printed on the facestock panels is now visible, if at all, lightly and in mirror image as shown. Because the facestock panels 1110 are smaller than liner panels 1112, the third and fourth liner panels have exposed adhesive perimeter edges 1158 around one or more edges. The fourth edge is mostly taken up by connecting hinge section 1170, so at least some of the fourth edge does not have exposed adhesive. In FIG. 38, the third and fourth liner panels have been folded together such that they adhere along their exposed adhesive edges 1158. The facestock panels are now disposed back-to-back with their printed faces facing outward and covered by the clear film. The assembly thus defines a double-sided self-laminating card with printing on both sides. The assembly has been created by a simple printing and a folding operation. The assembly can then either be folded at the hinged area on itself to form an independent two-sided laminated photographic ID badge or can be applied to an RFID card or similar device. Alternatives to the embodiment of FIG. 35 are shown in FIGS. 39 and 40 at 1184, 1188. These embodiments incorporate holes 1192, 1196 so that either the invention or the assembly of the invention with an RFID card or other device can be attached to a clip or lanyard.

Figure 44:
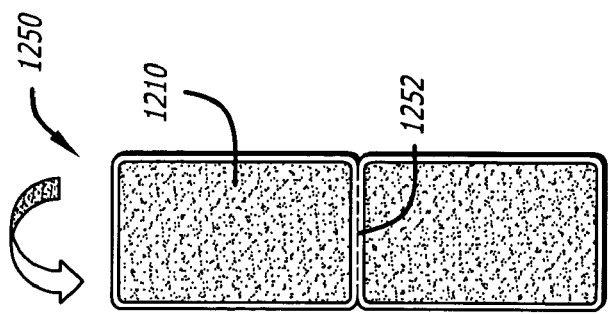
FIGS. 42, 43, 44 and 45 show successive assembly steps of the construction of FIG. 41.
Figure 43:
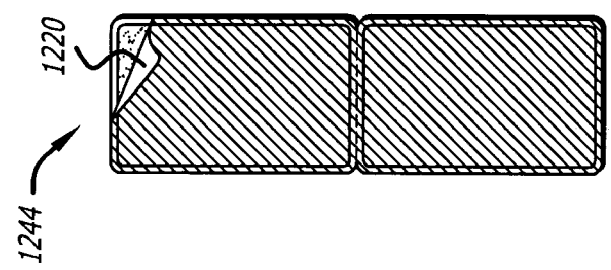
Figure 42:
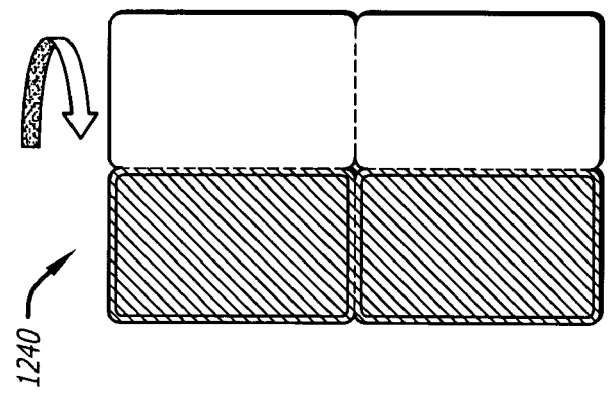
Figure 46:
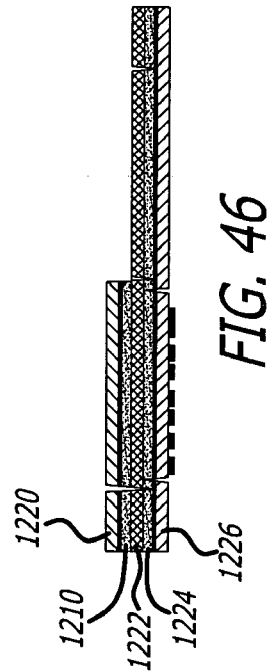
FIG. 46 is an enlarged cross-sectional view taken on line 46-46 of FIG. 41.
Figure 41:
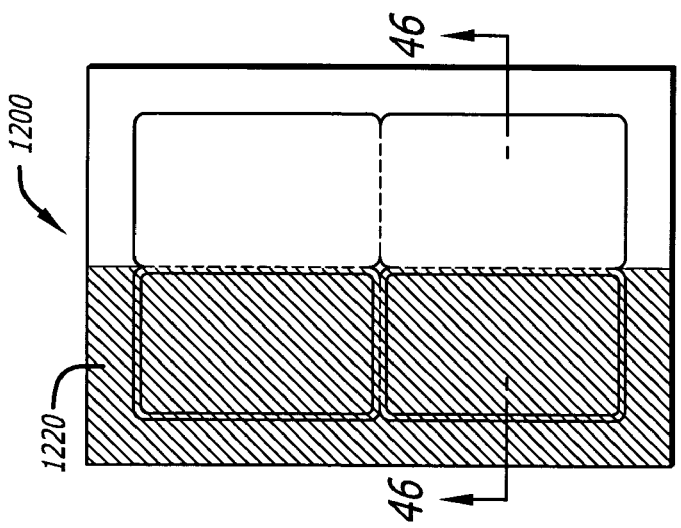
FIG. 41 is a front view of an eighth label sheet construction.
Figure 45:
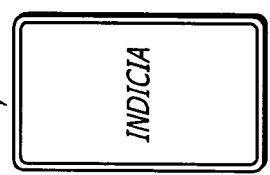

An eighth label sheet construction is shown in FIG. 41 generally at 1200. As best understood from FIG. 46, the embodiment includes an additional layer of adhesive 1210 and a silicone coated liner 1220 on one half of the sheet applied to the top surface of a clear film 1222, adhesive 1224, and silicone coated liner 1226 laminate. The user prints on the backside of the construction, and removes the assembly 1240 from the sheet as shown by FIG. 42. The removed sub-assembly 1240 is then folded on the clear half onto the printed indicia on the liner side as shown by FIG. 43 to form assembly 1244. The user then removes the top layer of liner to expose the adhesive 1210, as shown by FIG. 44 at 1250. Referring to FIG. 45, this can either be folded at the hinged area 1252 upon itself to form an independent two-sided laminated badge 1254 or it can be applied to an RFID card or similar device.

Figure 49:
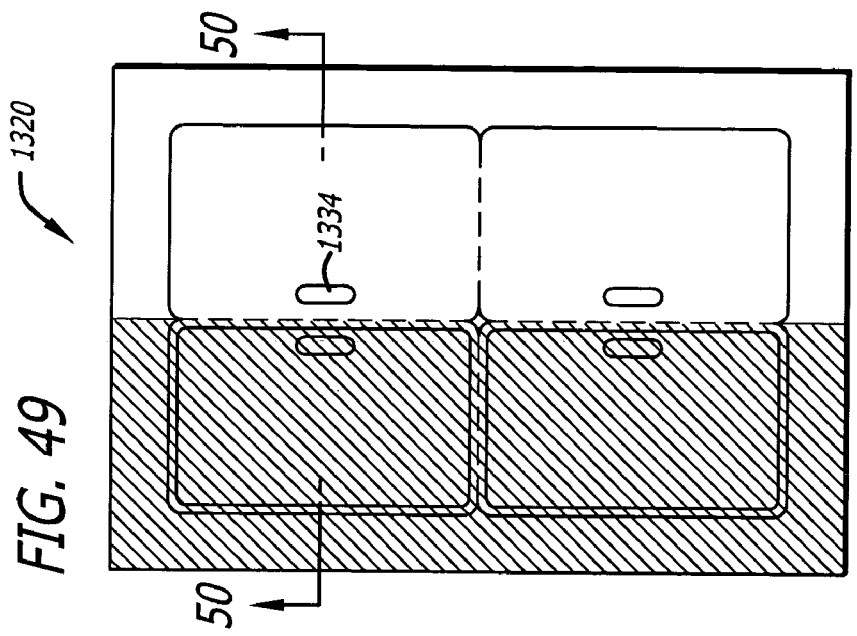
FIG. 49 is a second alternative of the construction of FIG. 41.
Figure 50:
FIG. 50 is an enlarged cross-sectional view taken on line 50-50 of FIG. 49.
Figure 47:
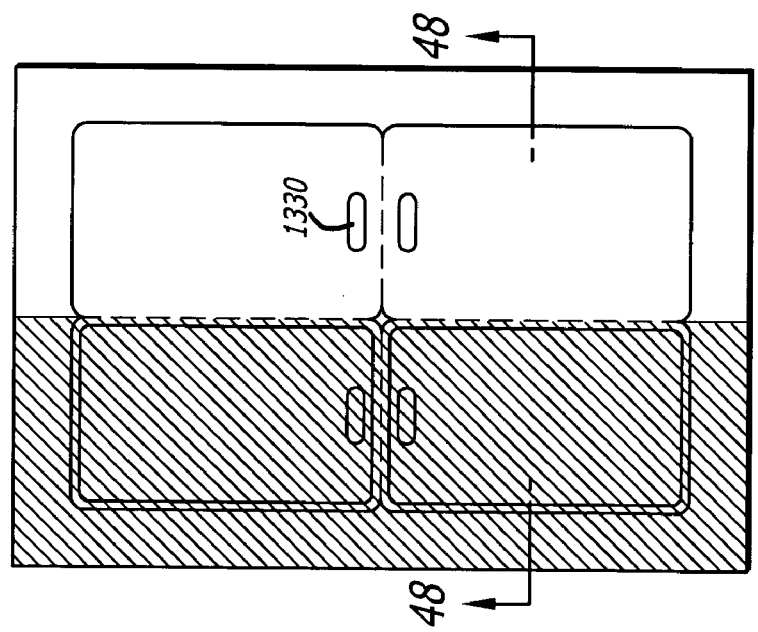
FIG. 47 is a first alternative of the construction of FIG. 41.
Figure 48:
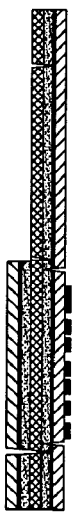
FIG. 48 is an enlarged cross-sectional view taken on line 48-48 of FIG. 47.

Two alternatives are shown in FIGS. 47 and 48 at 1300 and in FIGS. 49 and 50 at 1320, respectively. They are designed and utilized to incorporate holes 1330, 1334 so that either the invention (or the assembly of the invention with an RFID card or other device) can be attached to a clip or lanyard.

The embodiments of FIGS. 29-50 have many advantages. The embodiments of FIGS. 29-34 are simple to make, simple to use and provide an adhesive area around the entire perimeter of the badge. The embodiments of FIGS. 35-40 are simple to use and provide adhesive around most of the perimeter. In the case of the badge with holes, the area without adhesive is the same area that will be attached to a clip or lanyard and is therefore protected from potential delamination by the clip or lanyard attachment. The embodiments of FIGS. 41-50 provide full adhesive coverage on the backside of the badge, thereby providing a secure attachment.

These badges are one or two sided and are water resistant, scratch resistant and unmodifiable once assembled. They can use materials that are less expensive than industry standard PVC cards. They are printable in inkjet or laser printers. They do not require specialized printers as is the norm in the industry today. They can be formed as independent units that are printed and laminated on both sides. They can be applied to two sides of an RFID card or similar device. They can be provided in 4×6 inch or 5.5×8 inch, or other size formats that can be printed one at a time. The user can print identical information on both sides for clear visibility or print on the other side other information such as company logo, mission statement, visitor policy, safety regulations and so forth as a way of using the badge to convey additional information. The two sided badge with the hole can be used as the lanyard without a sleeve.

The preferred manufacturing steps for the label (badge) sheet constructions disclosed herein can be those common to standard label converting adapted for the present invention, with the exception of the latter embodiments with the adhesive release liners. The additional step for those embodiments is the application of the adhesive/release liner or adhesive/intermediate layer/adhesive/release liner to the web during the converting process. The preferred application point would be after the liner has been die cut, but before the face die cut. On the other hand, it can be applied before both liner and face die cutting operations, if the dies are cleared properly. It would not be applied after die cutting, however, as the additional layers need to be die cut coincident with the face die cuts on the transparent film.

Figure 52:
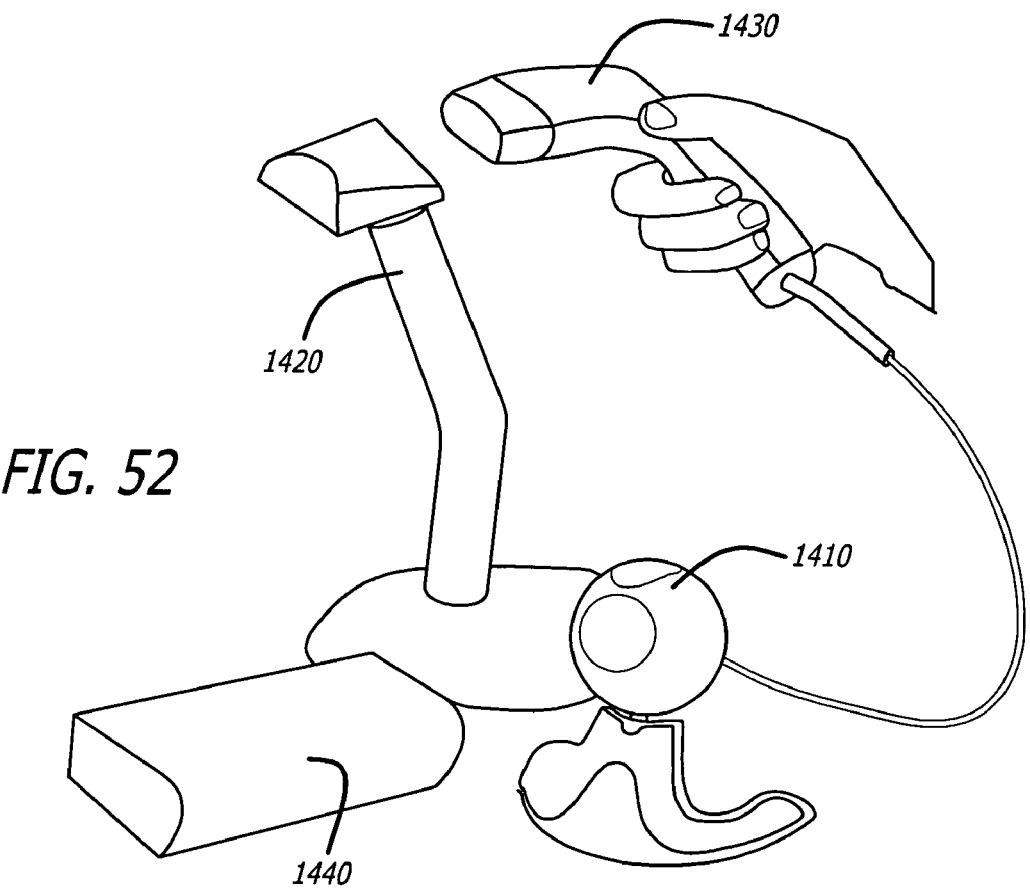
FIG. 52 is a perspective view of a portion of a system of the invention.

A further embodiment of the present invention is in a system or kit form and can be sold with all components in a box or other package. Referring to FIG. 52, the system kit can include a web camera 1410, adjustable camera stand 1420, bar code scanner 1430, and USB hub 1440, in addition to photo ID badge labels, Clean Edge photo ID badges (visitor size), visitor size badge holders with clip (see FIG. 53 at 1500), Clean Edge photo ID badges, conventional size badge holders (neck hanging style), and self laminated photo ID badges with clips. The necessary but easy to learn software CD can be included. Preferred system requirements are Windows 2000 or Windows XP Professional and Home, Pentium Class CPU chip, 600 MHz or better, 64 MB RAM, one hundred and 128 MB RAM recommended, 2.0 GB hard drive or more, and a USB port. The badges can be provided in the badge label constructions as disclosed herein, and as shown in one or more of the drawing figures. Preferred embodiments are discussed below.

The photo ID badge labels adhere firmly but remove easily. They allow vivid colors to be printed as well as sharp text. They preferably are white labels adapted for inkjet printing and are a 2.25×3.5 inch label on a 4×6 inch sheet.

The CLEAN EDGE photo ID badges are professional looking with no perforations. They also print vivid colors and sharp text. They are preferably white and are adapted for inkjet printing. The visitor size can have two-sided printing and can be 2.25 inch by 3.5 inch, two-sided badges on a 4×6 inch sheet. The convention size can be 3 by 4 inches and printed on a 4×6 inch sheet. The self-laminating photo ID badges are long lasting with one step lamination. There is one 2.25×3.5 inch laminated badge per 4×6 inch sheet.

The sheet on which the badge is printed can be also be other sizes that are less than a full sized 8½×11 inch sheet or A4 sized (21 cm×29.7 cm). Such sheets of less than full size can include, for example, sheets of size less than 12 cm×18 cm. Single discrete sheets of less than full size can be fed into a printer one at a time for creating exactly one badge at a time.

This system provides a professional visitor registration and photo badging system that quickly produces photo ID badges and creates permanent log records. In an exemplary system, color photo ID badges are quickly printed in three easy steps with a standard inkjet printer. First the desired information is typed into the computer. Second, a photo of the visitor is taken using the web camera 1410. The information is then printed by the printer onto the badge sheet. At the same time as the rest of the information is printed on the badge, a bar code or other indicia can also be printed on the badge which indicates a date and time at which the visitor entered the facility, or a date and time at which the visitor's entry was authorized, or a date and time at which the badge was printed, or a unique badge identification number or serial number. Similarly, a bar code or other indicia printed on the badge can additionally or alternatively indicate the expiration day or time of the badge. In one embodiment, a two-sided badge constructed according to the disclosure herein may include a photograph on one side, and visitor restriction information on the other. The visitor restriction information may include, for example: conditions of entry and conditions of continued presence on the premises; requirements for logging in and out of the facility; restrictions on the use of cameras, tape recorders, and video recording equipment; and any other pertinent information.

FIG. 72 illustrates such a two-sided badge after printing but before separation from the carrier material. The visitor himself may specify some of the information to be printed on the badge such as the visitor's, and may print the badge himself when all of the necessary information has been entered and the system has taken his photograph.

The system sets up easily in minutes and allows for the creation of a data base with a retrievable and permanent visitor registration records and reports with photos for visitors, contractors or employees. Photo badges can be created for meetings, conferences, events in schools, and the like.

A ninth sheet construction embodiment is shown generally at 1600 in FIGS. 54 and 55, and 59 and 60. Construction 1600 can be made of a paper (or opaque film) facestock 1604, adhesive 1610, and a liner sheet 1614 with a release coating 1620. Weakened separation lines 1630 (formed as discussed above) in the facestock 1604 form side-by-side first and second labels 1640, 1644, a fold line 1650 separating them, and (lanyard) holes 1654, 1658.

Figure 55:
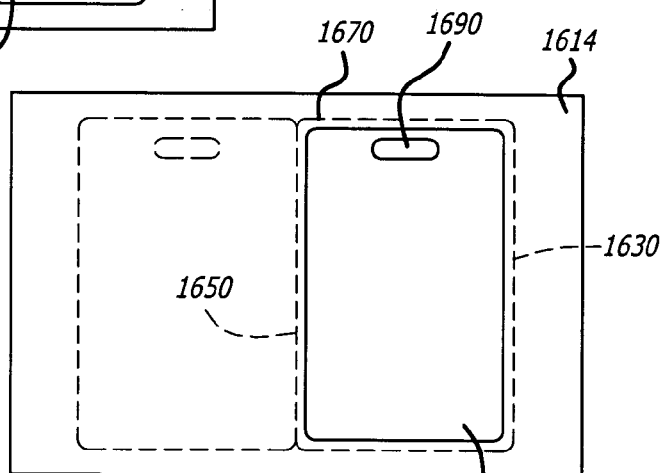
FIG. 55 is a rear view thereof.

Weakened separation lines 1670 in the liner sheet form a liner panel 1680 and a hole 1690 therethrough, as illustrated in FIG. 55.

Figure 56:
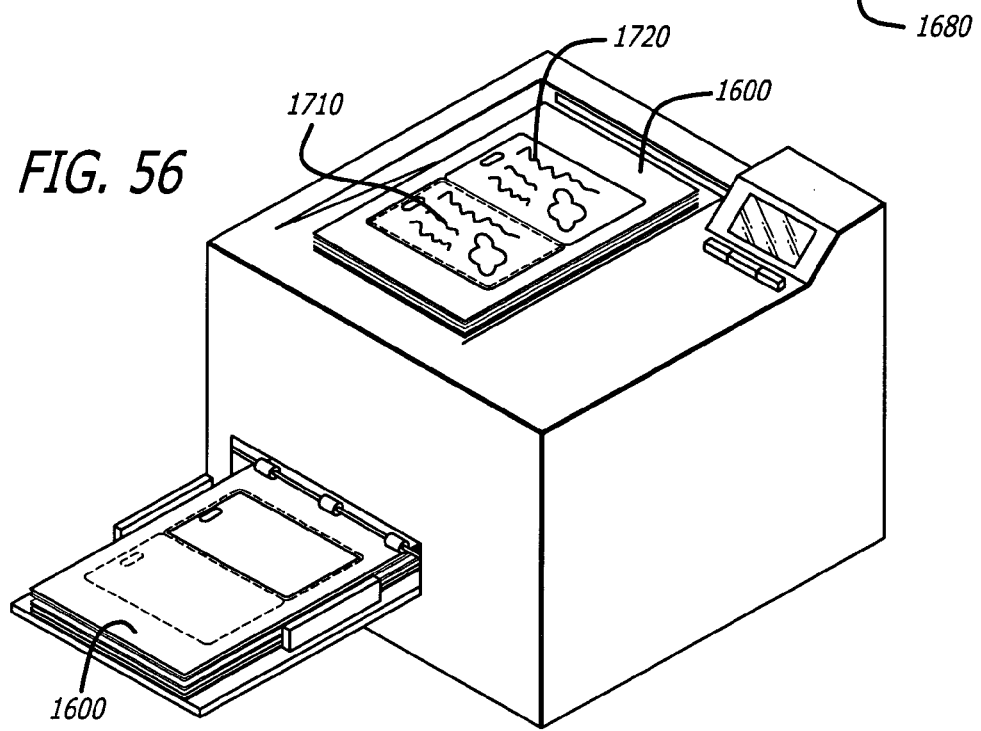
FIG. 56 is a perspective view showing a stack of the sheet constructions of FIG. 54 being passed through a printer or copier (such as a desk top inkjet printer) and desired indicia being printed on the facestock label assembly portion thereof.
Figure 57:
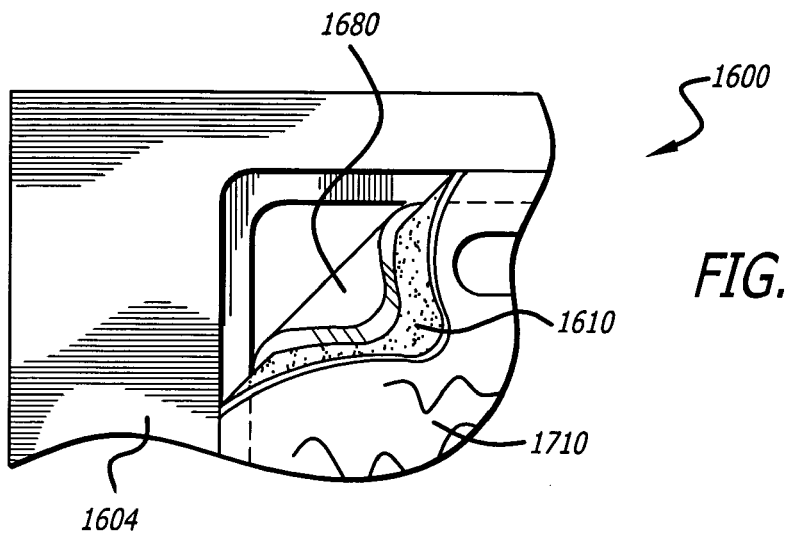
FIG. 57 shows a corner of the printed label assembly being removed from the ninth label sheet construction.

The sheet 1600 is passed through a printer or copier 1700 such as shown in FIG. 56 and desired indicia as previously discussed 1710, 1720 printed on the first and second labels 1640, 1644. The label assembly 1730 is separated by peeling off as shown in FIG. 57 with the liner panel 1680 attached to the back of one of the labels. The separated label assembly 1730 with the holes formed such as by punching out the hole material is then folded on the fold line 1650 and the perimeter adhesive edges adhered together, as can be understood from FIGS. 58 and 59. In other words, the liner panel 1680 leaves an exposed adhesive edge on the back of the labels that seals the card closed.

A preferred embodiment as discussed in the paragraph above and elsewhere in this disclosure is to print such as with a desktop inkjet printer on the facestock sheet of the sheet construction. Another embodiment is to print the desired indicia instead on the liner sheet. This is particularly pertinent where the facestock sheet is a clear film. The printing on the liner sheet can be used in the other embodiments disclosed anywhere in this disclosure in addition to those which include the liner panels.

Figure 58:
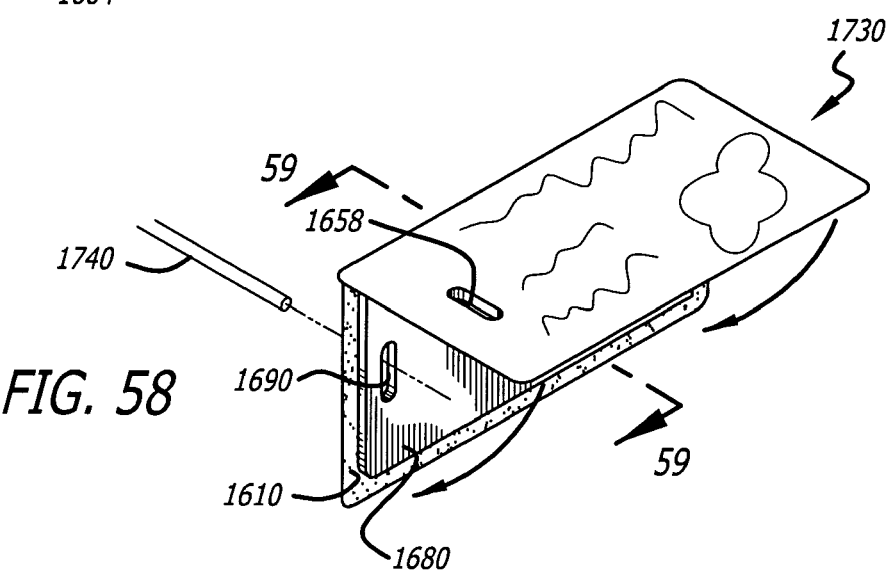
FIG. 58 is a perspective view of the printed removed label assembly of FIG. 57, showing the assembly being folded into position and a clip or lanyard being inserted through the aligned holes of the label assembly.
Figure 59:
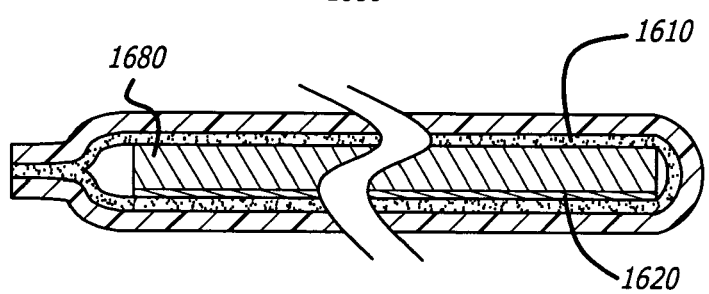
FIG. 59 is an enlarged cross-sectional view taken on line 59-59.
Figure 60:
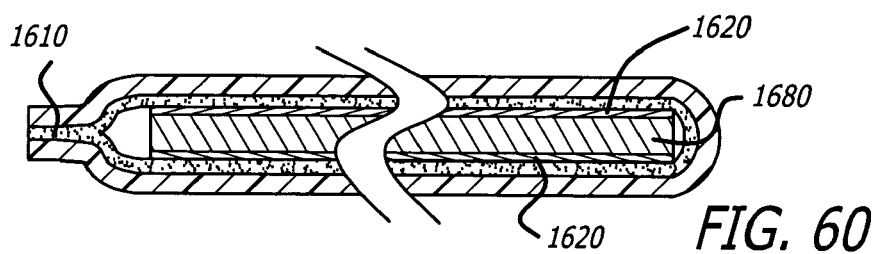
FIG. 60 is a variation of the embodiment of FIG. 59.

The through-holes 1654, 1658, 1690 in the first and second labels and the liner panel are aligned with the badge assembled. The liner panel 1680 thereby reinforces the hole. In other words, the liner panel or section remains between the two labels to provide additional strength for attachment to a clip or lanyard 1740 such as shown in FIG. 58, providing three layers at the point of attachment. The liner panel 1680 stiffens the resulting card. One embodiment allows the "card" to be opened again, where the liner panel is more of a carrier that may or may not have a release material coated onto it.

The materials used can be film (coated) or paper (coated or uncoated) for the face or the release. The thickness of the total construction is preferably from five mils to thirteen mils. A preferred construction is an inkjet coated paper facestock and a release-coated paper liner, with individual thicknesses of between 2.5 and 6.0 mils each. The adhesives are pressure sensitive adhesives which can be emulsion based, hot melt or solvent based. The adhesive preferably has a thickness of between 0.25 mil and 2.0 mils.

Another embodiment is where the hole is not surrounded by the enveloped liner panel or piece 1690. A further embodiment adds more layers between the labels. For example, a small sheet of cardstock (not shown), roughly the same size as the liner panel, can be inserted between the labels to further stiffen the construction.

An RFID card as previously discussed can be held between the labels. This device can be a chip or a small card or paper that carries the device.

Figure 54:
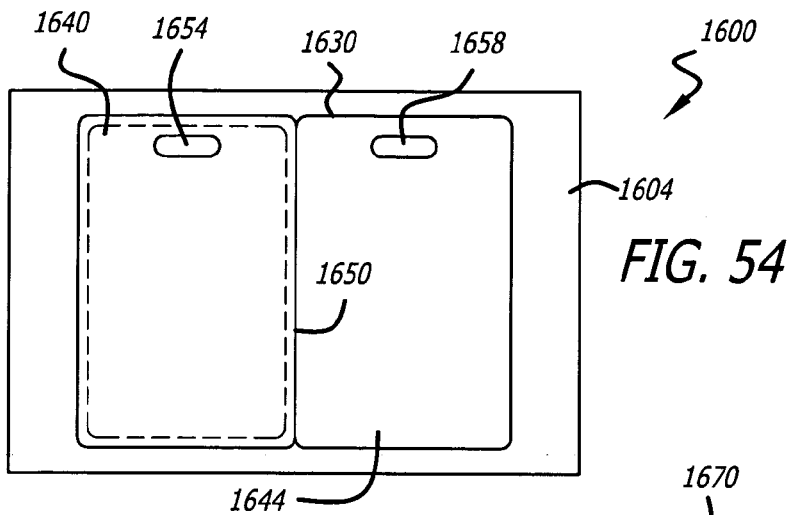
FIG. 54 is a front view of a ninth label sheet construction.
Figure 61:
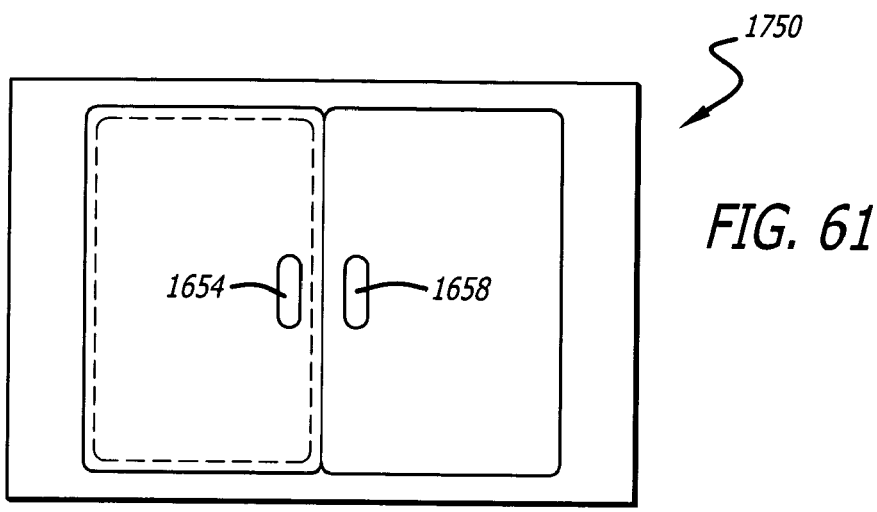
FIG. 61 is a front view of a first alternative of the construction of FIG. 54.

The holes 1654, 1658 can be positioned near the horizontal edge, as shown in FIG. 54, or on vertical edges as shown by the alternative embodiment shown generally at 1750 in FIG. 61.

Figure 62:
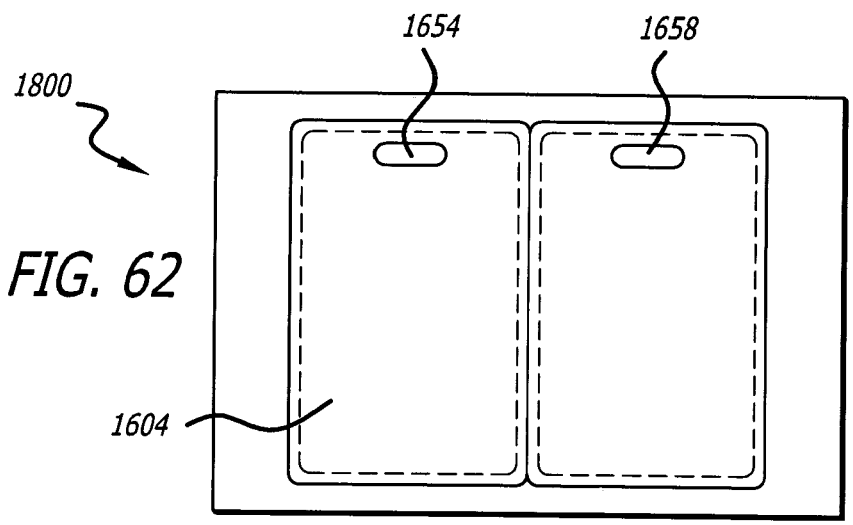
FIG. 62 is a front view of a tenth label sheet construction.
Figure 63:
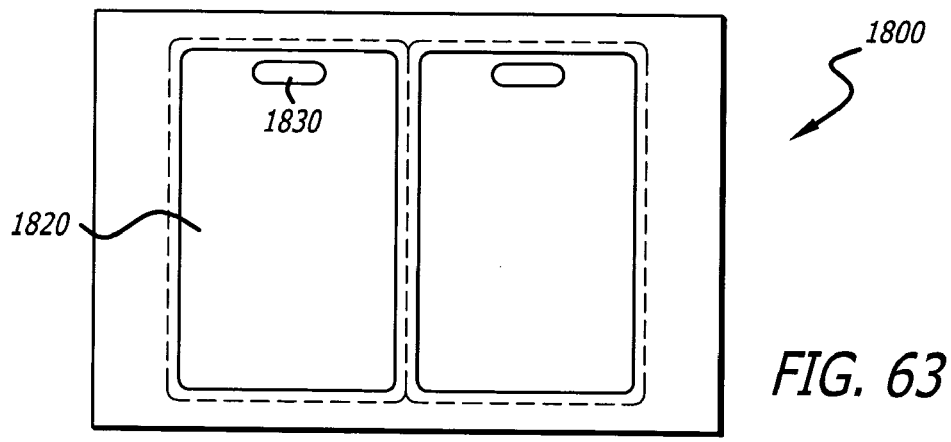
FIG. 63 is a rear view thereof.
Figure 64:
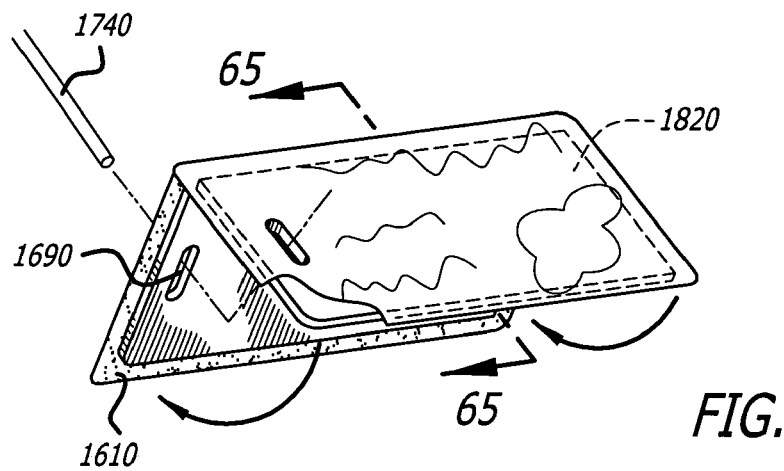
FIG. 64 is a perspective view of a label assembly of the construction of FIG. 62 (after a printing operation on the labels thereof (see, e.g., FIG. 56) and after the printed label assembly has been removed from the underlying construction (see, e.g., FIG. 58)), showing the assembly being folded into position and a clip or lanyard being inserted through the aligned holes.
Figure 65:
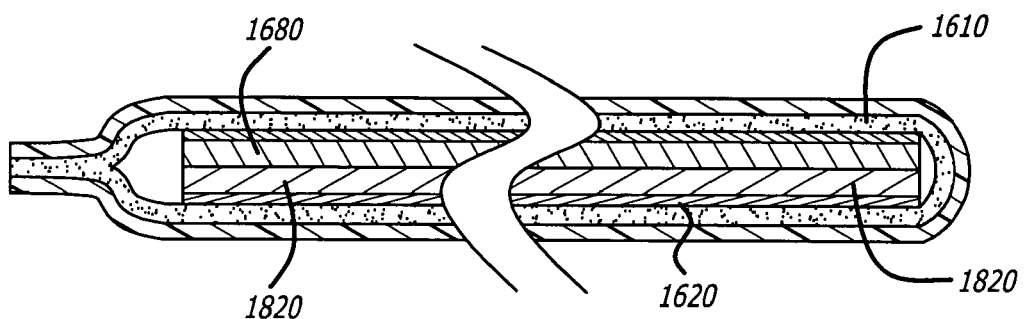
FIG. 65 is an enlarged cross-sectional view (similar to FIG. 59) of the folded label assembly of FIG. 64 taken on line 65-65.
Figure 66:
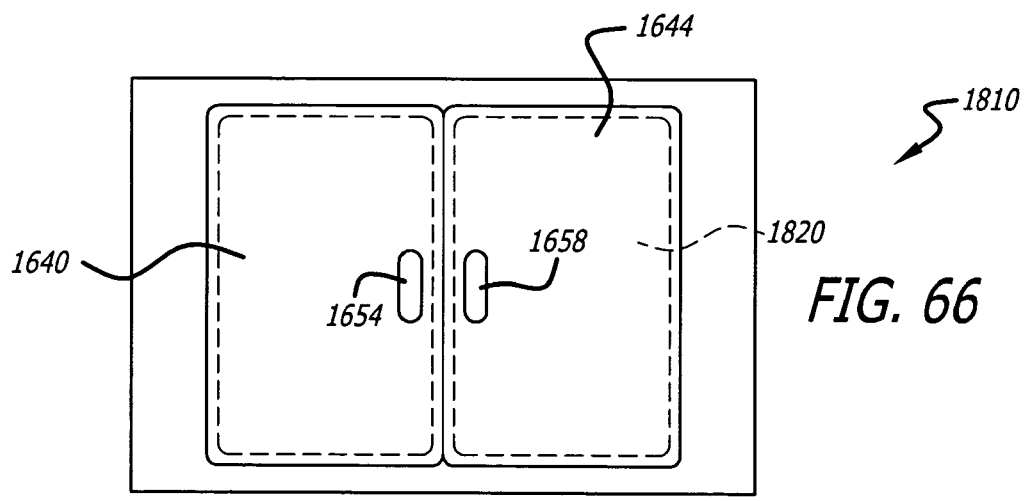
FIG. 66 is a front view of a first alternative of the construction of FIG. 62.

A tenth sheet construction embodiment is shown generally at 1800 in FIGS. 61 and 62. The alternative construction 1810 of FIG. 66 is similar to the embodiment shown in FIG. 61 except for the location of the holes (similar to FIG. 61). Constructions 1800 and 1810 are similar to embodiments 1600 and 1750 except that liner weakened separation lines form a second liner panel 1820 which is adhered to the back of the other label. The second liner panel 1820 has a through-hole 1830 which aligns with the holes of the other liner panel and the labels when the label assembly is assembled, as can be understood from FIGS. 64 and 65. A "four layer" badge is thereby formed. More layers or plies increase the product (badge) stiffness, making the construction more like a card and less like a folded label.

Other versions of the constructions of FIGS. 54-66 would not include any of the above-discussed holes.

Different product specifications for the constructions of FIGS. 54-66 will now be set forth:

For badges: facestock/adhesive/liner/total reinforced badge; (2×facestock+2×adhesive+1×liner); Preferred grammage is 90/20/55/275 g/m$^2$; Preferred thickness is 100/20/60/300 μm; Materials: matt coated inkjet label construction, laser label construction; any label construction, for business cards also glossy photo quality label constructions.

For business cards, the preferred grammage is 125/20/80/370 g/m$^2$, and the preferred thickness is 125/20/90/380 μm.

Ranges: grammage preferred minimum: 60/5/45/175 (220 if two liner panels) although lower grammage versions are possible; grammage preferred maximum: 250 to 300 g/m$^2$ (of the label construction) is the preferred maximum for today's printers. A special construction for this application would be a 200 g/m$^2$ facestock with 20 g/m$^2$ adhesive and an 80 g/m$^2$ liner would give the 300 g/m$^2$ label construction, making a reinforced business card of 520 g/m$^2$.

It is also possible to make the liner but not the facestock thicker. Stiffer albei more expensive filmic liner can also be used. Facestocks can be matt coated inkjet and laser facestock or any facestock used for labels.

A permanent pressure sensitive adhesive is preferred. However, any adhesive that gives a good bond to the backside of the liner or any reinforcement element can be used. The adhesive layer can have grammage and thickness of 20 g/m$^2$ and 20 μm. The tolerance of existing label stocks is approximately +/−5 g/m$^2$. The workable range is higher. Less adhesive even would generally be recommended to minimize the elastic (adhesive) component in the construction, which makes the final badge stiffer. However, adhesive coat weights less than 5 g/m$^2$ are more difficult to produce.

The sheet size can be A4, letter size, A6, 4×6 inch, or generally any format that is printable with today's laser or inkjet printers. If the original sheet size is A4, the maximum size of a reinforced product is A5 because one must flip at the perforations or scored line positioned in the middle of the sheet. In other words, the maximum size of a reinforced badge or other product is half the sheet size, that is, A5 if the user starts with an A4 sheet. Any smaller size is feasible depending on the application of the reinforced badge.

The primary application for these constructions is for identification badges, which can range from 2⅛×3⅜ inch to 3×4 inches. However, it is not limited to these sizes. It can any size up to generally 8½ inch×5½ inch. Alternatively, the badge size can be preferably 54×85 mm for the version without the hole and 60×85 mm for the version with the hole.

In addition to identification badge labels this invention can be used for business cards, and all CLEAN EDGE card applications such as CD inserts, post cards and the like. The liner panel reinforcement invention is not limited to badges, but includes other products such as business cards. The requirements and the materials that may be used can be different. One big difference is the sheet format and the hole: for badges the sheet size can be A6 or 4×6 inch, for both the versions with the hole and without the hole. For business cards, the sheet size is A4 or letter size; no hole. This invention can also be adapted as needed and used for RFID tags for industrial, commercial or personal applications, signage, and membership cards.

When the sheet construction is sold in a kit form, in addition to a stack of the sheets, software and an instruction sheet can be included in the box, bag or other container package. The kit can also include strap clips, which typically comprise a strip of plastic with male and female snap closures attached to a spring loaded clip. Additionally, the kit can include the previously mentioned software as well as hardware such as web cams, bar code scanners, USB hubs, etc., and other printable badges.

As a further feature, the hole for the badge may be shaped in a way to help ensure that the badge hangs straight. FIG. 67 shows two views of an injection molded badge clip offered for sale by TEMTEC of Suffern, N.Y., which is a division of Brady Worldwide. Badge clip 6710 includes a generally round post 6712 having a flattened head 6714 on the end of the post. FIG. 68 illustrates one example of a badge construction employing a hanger hole design that allows the badge to hang uniquely straight from badge holders including badge holder 6710. The hole in the portion of the badge that does not include the liner section has a hole formed by a weakening line, such as a die cut, through the face and adhesive layer only. The weakening line extends around the full perimeter of the hole without interruption, so that it will tend to stay with the carrier sheet when the badge is removed. Alternatively, the weakening line could contain interruptions such as ties, to retain the section with the badge for removal at a later time, if so desired. One benefit of the latter design is that the user could also choose to leave the hole material in place and put the entire assembly in a badge holder.

The second hole, which is located on the portion of the badge that incorporates the liner section, has a weakening line that extends through the entire laminate construction. It could contain two or more interruptions, such as ties, to retain the hole in the sheet until the end user is ready to remove the hole. Alternatively, the weakening line around the hole could be continuous, and the hole could be removed during the manufacturing process.

Figure 53:
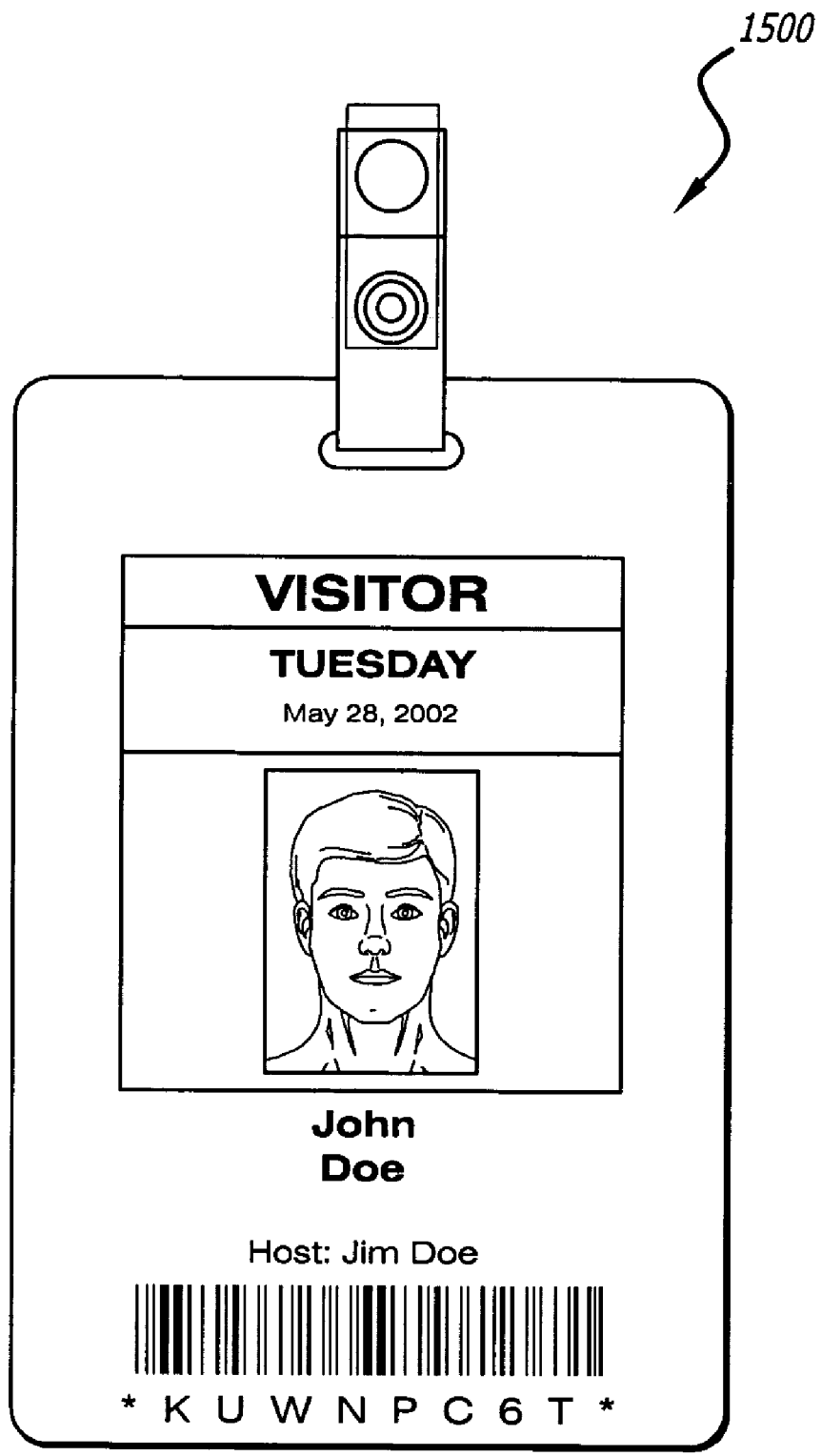
FIG. 53 is a front view of a clear flexible badge of the present invention with a garment friendly clip.

FIG. 69 illustrates in greater detail the construction of badge hanger hole 6910. Badge hanger hole 6910 includes two elongated portions 6912 and a central expanded hole section 6914. Expanded hole section 6914 is defined by a rounded upper edge 6915, or raised radius or detent, which rises above a line defined by upper edges 6913 of elongated hole sections 6912. The hole is configured in such a way as to accommodate several different methods of hanging the badge. Elongated sections 6912 accommodate a conventional badge strap clip such as shown in FIG. 53. At the same time, elongated sections 6912 and central expanded portion 6914 cooperate to allow the flattened head 6714 and the distal portion of post 6712 of clip 6710 to be inserted through hole 6910. The badge then rests on post 6712 at the rounded upper edge 6915 of hole 6910. The height of hole 6910 is smaller than the diameter of post 6712 except in the central area where the detent is located. This captures the post in the center of hole 6910, so that the badge is always equally balanced and will remain hanging horizontally, as shown in FIG. 68D.

Figure 70:
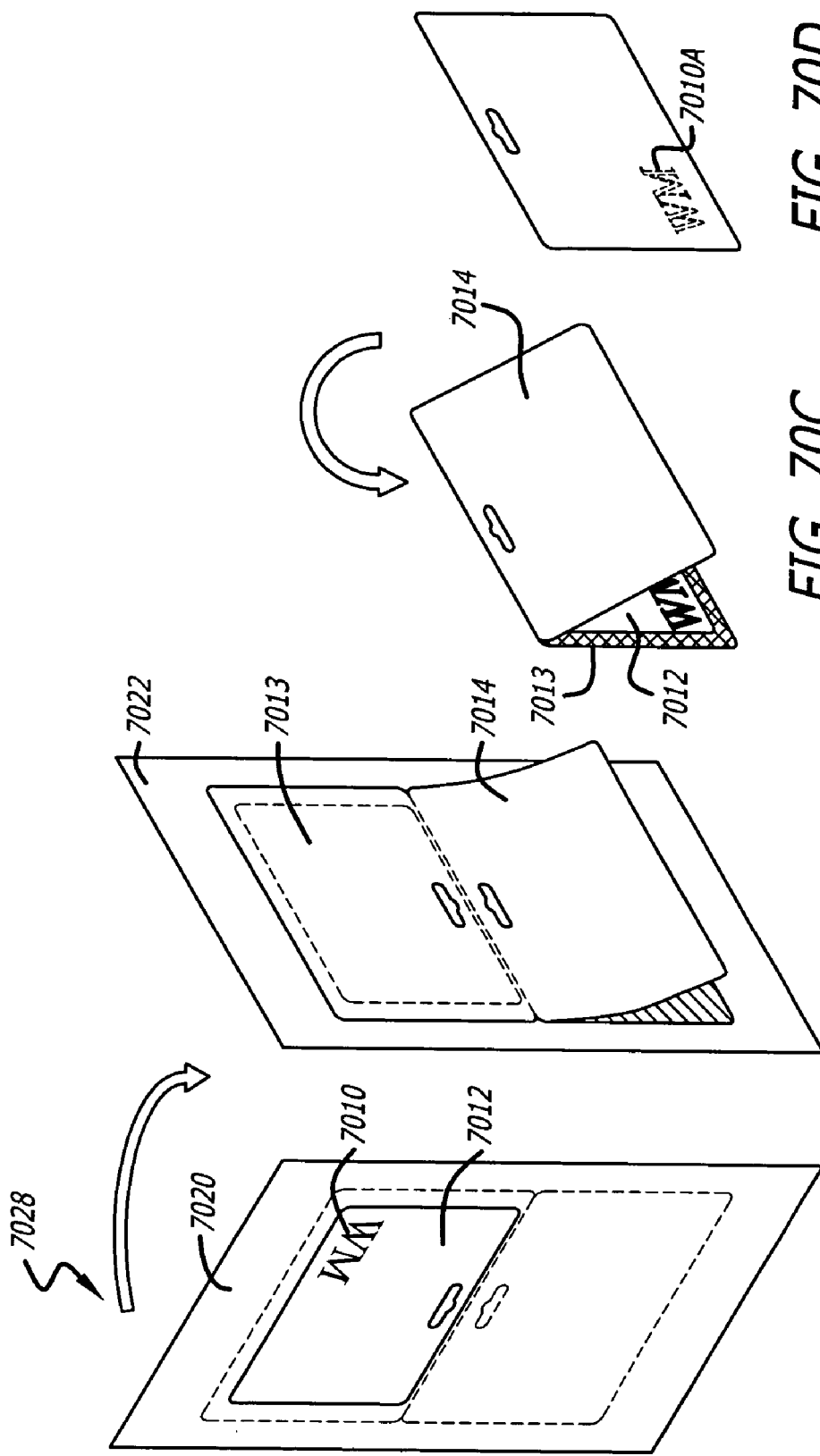
FIG. 70 illustrates an optional security feature of the present invention, in which a security mark is preprinted on the sticky side of a label sheet.

FIG. 70 illustrates a novel security feature which increases the difficulty of counterfeiting badges of the present invention. The manufacturer of the stock sheet 7028 from which the badges are made may incorporate an image or mark 7010 that will be barely visible on the face of the badge after the badge has been printed and assembled as shown in FIG. 70D. As shown in FIG. 70A, the image 7010, which may be a corporate logo, text, and/or another mark or feature, may be pre-printed on the back of the liner sheet 7020 within the area of a liner panel 7012 defined by a weakened separation line such as die cuts within liner sheet 7020. Alternatively, the company which will issue the badge may print the mark on the liner sheet. FIG. 70B shows the facestock side of the construction of FIG. 70A. The facestock sheet 7022 includes weakened separation lines such as die cuts which define first and second facestock panels 7013 and 7014 which will define the faces of the ID badge or other security card. The first and second facestock panels are preferably separated by a fold line, fold hinge, or the like, such as by perforations or a fold crease. In FIG. 70C, the portions that will define the badge have been removed from the sheet 7028. The mark 7010 is visible on the liner panel 7012. An exposed adhesive edge around the periphery of first facestock panel 7013 adheres to second facestock panel 7014, thus holding the two faces of the ID badge together. Additionally, the side of panel 7014 with exposed adhesive over the entire face adheres to the combination first facestock panel 7013 and liner panel 7012. The now lightly visible mark 7010A shows through the second facestock panel 7014, assuming that that facestock panel is not completely opaque. The assembled construction as shown in FIG. 70D defines a photographic ID badge or other security card having a lightly visible security mark 7010A similar to what is referred to in the industry as a watermark. Someone seeking to verify the authenticity of the badge would look for the lightly visible image as a means of verification. The holes as shown for a lanyard or clip extend through three layers (two facestock layers and a liner layer) thus making the hole stronger than in a two-layer construction.

In an alternative construction, a similar security feature may be used in the self-laminating construction such as shown and described herein. In this embodiment, the security mark could be pre-printed by the stock material manufacturer on the sticky side of either the clear film or the facestock before the adhesive is applied to that side. In this way, the mark preprinted on the sticky side would show lightly through the facestock material to the side which is printed on when the badge is made, which the laminated badge is assembled.

A photographic identification badge is generally understood to include a badge or other identifying media which may be worn or otherwise displayed openly, and which commonly includes a photograph of a person's face. However, the invention is not limited to use with identifying media on which a person's face is printed and which is displayed openly, and could be used to print a variety of identifying cards which, for example, might be carried in a wallet, pursue, or pocket. Accordingly, the term "badge" as used herein is not limited to media which is worn or displayed openly or which necessarily contains a photographic image of a person's face.

The constructions and methods of the present application can be used in/with the constructions, systems and methods disclosed in the listed related applications as would be apparent to those skilled in the art. Accordingly, from the foregoing detailed description, it will be evident that there are a number of changes, adaptations and modifications of the present invention that come within the province of those skilled in the art. The scope of the invention includes any combination of the elements from the different species, embodiments, alternatives, materials, functions and/or subassemblies disclosed herein, as would be within the skill of the art from this disclosure. It further is intended that all such variations not departing from the spirit of the inventions be considered as within the scope thereof.

We claim:

1. A photographic identification card comprising:
    a label assembly having substantially symmetrical first and second labels connected together, the first and second labels each having adhesive on a respective back side thereof, the adhesive having been exposed by removal of a liner sheet from the back side of each label after a printing operation, at least one of said labels having a photograph of a person printed on a front side thereof; and
    an RFID card disposed and held between the first and second labels by the adhesive on the back sides thereof.

2. The photographic identification card of claim 1 wherein the first and second labels both include through-holes which are aligned with one another when the label assembly is in the folded position.

3. A construction, comprising:
    a facestock label assembly including a first opaque label, a second opaque label and a fold mechanism between them, at least one of the first label and the second label bearing a photograph and a machine readable code;
    adhesive on a back side of the facestock label assembly;
    a liner panel adhered with the adhesive to the first label; and
    the label assembly being folded on the fold mechanism and the first and second labels being adhered together by the adhesive and disposed back-to-back with at least the liner panel disposed therebetween; and
    an RFID card disposed and held between the first and second labels;
    whereby the completed construction includes said two opaque labels formed of facestock material with said liner panel sandwiched therebetween providing structural reinforcement for the labels, and having printing on at least one outwardly facing surface of at least one of said two labels.

4. The label sheet of claim 3 wherein a photograph is printed on only one of the two labels.

5. The label sheet of claim 3 wherein the machine readable code is a bar code.

6. The construction of claim 3 further comprising the liner panel defining a first liner panel, and a second liner panel adhered with the adhesive to the second label and disposed between the first and second labels.

7. The construction of claim 6 wherein each of the first label, the second label, the first liner panel and the second liner panels has a through-hole, the through-holes all being aligned with one another.

8. The construction of claim 3 further comprising indicia printed on at least one of the first and second labels.

9. The construction of claim 3 wherein the liner panel has a release coating.

10. The construction of claim 3 wherein the hinge mechanism is a fold line.

11. The construction of claim 3 wherein the fold line is a scored line.

12. The construction of claim 3 wherein the construction is an identification badge.

13. The construction of claim 3 wherein the construction is a business card.

14. The construction of claim 3 wherein the construction is a tag.

15. A label sheet construction, comprising:
a liner sheet;
a facestock sheet releasably adhered to the liner sheet; and
at least one weakened separation line through the facestock sheet and defining a label assembly, the label assembly including a first label and a second label, the label assembly further including a fold line or a fold hinge between the first and second labels, the label assembly being removable to a separated position from the facestock sheet after a printing operation on at least one of the first and second labels, the label assembly when in the separated position being foldable to a folded position wherein at least one of the first and second labels is folded towards the other on the fold line or the fold hinge;

wherein each of the first label and the second label has a respective cut therein to facilitate creating a hole, each hole when formed having two elongated side portions and an expanded central portion having a curved upper portion and a central portion height that is greater than heights of either of the elongated side portions; and wherein when the label assembly is in the folded position, rear faces of the first and second labels are adhered to opposite sides of an RFID card.

16. The construction of claim 15 wherein the first and second labels both include through-holes which are aligned with one another when the label assembly is in the folded position.

17. The construction of claim 15 further comprising a liner sheet section on a portion of the liner sheet.

18. The construction of claim 17 wherein the liner sheet section includes a release-coated liner sheet section on adhesive.

19. The construction of claim 17 further comprising a hole through the facestock sheet.

* * * * *